United States Patent [19]

Bannai

[11] Patent Number: 5,675,827
[45] Date of Patent: Oct. 7, 1997

[54] INFORMATION PROCESSING SYSTEM, A PROCESSOR, AND AN INFORMATION PROCESSING METHOD FOR THE PERFORMING OF AN ARITHMETIC OPERATION OF NUMERIC INFORMATION

[75] Inventor: Yuichi Bannai, Tokyo, Japan

[73] Assignee: Canon Kabushiki Kaisha, Tokyo, Japan

[21] Appl. No.: 376,675

[22] Filed: Jan. 23, 1995

Related U.S. Application Data

[63] Continuation of Ser. No. 745,967, Aug. 12, 1991, abandoned, which is a continuation of Ser. No. 267,615, Nov. 2, 1988, abandoned, which is a continuation of Ser. No. 789,925, Oct. 21, 1985, abandoned, which is a continuation of Ser. No. 377,676, May 12, 1982, abandoned.

[30] Foreign Application Priority Data

| May 21, 1981 | [JP] | Japan | 56-77028 |
| Jul. 15, 1981 | [JP] | Japan | 56-109288 |
| Jul. 24, 1981 | [JP] | Japan | 56-115256 |

[51] Int. Cl.$^6$ ................................ G06F 15/00
[52] U.S. Cl. ................................ 395/801
[58] Field of Search ............ 364/DIG. 1, DIG. 2, 364/708; 340/709; 341/90; 395/775, 801

[56] References Cited

U.S. PATENT DOCUMENTS

| 3,610,902 | 10/1971 | Rahenkamp et al. | 364/200 |
| 3,940,758 | 2/1976 | Margolin | 400/78 |
| 4,016,411 | 4/1977 | Genin | 364/710 X |
| 4,087,852 | 5/1978 | Campbell et al. | 364/200 |
| 4,162,532 | 7/1979 | Olander, Jr. et al. | 364/710 |
| 4,180,337 | 12/1979 | Otey, III et al. | 400/486 |
| 4,200,913 | 4/1980 | Kuhar et al. | 364/900 |
| 4,212,553 | 7/1980 | Acosta et al. | 364/200 X |
| 4,223,393 | 9/1980 | Abe et al. | 364/900 |
| 4,240,142 | 12/1980 | Blahut et al. | 364/200 |
| 4,291,372 | 9/1981 | Forbes et al. | 364/200 |
| 4,323,315 | 4/1982 | Delmonte et al. | 400/83 |
| 4,334,286 | 6/1982 | Kerigan et al. | 364/900 |
| 4,334,792 | 6/1982 | Joest, III et al. | 364/900 X |
| 4,360,892 | 11/1982 | Endfield | 364/900 |
| 4,375,922 | 3/1983 | Maegawa et al. | 400/279 |

(List continued on next page.)

FOREIGN PATENT DOCUMENTS

| 0069084 | 4/1982 | Japan | 400/83 |
| 0069085 | 4/1982 | Japan | 400/83 |
| 5668135 | 4/1983 | Japan | 340/709 |
| 0171980 | 10/1983 | Japan | 400/78 |
| 3239842 | 5/1984 | Japan | 400/83 |

OTHER PUBLICATIONS

Displaywriter System Operator Training, IBM, Form S544–2023–0, Book 2, 1980, pp. 14–2–14–6, and 14–18–14–19.

IBM Technical Disclosure Bulletin, "Microprocessor–controlled Cursors", Judd et al., vol. 22, No. 5, Oct. 1979, pp. 2103–2105.

"Displaywriter System Manual", IBM, Form S544–2023–0, Book 2, 1980, pp. 14–2–14–6, and 14–78, 14–79.

IBM Technical Disclosure Bulletin, "Micro–processor–controlled cursors", Judd. et al, vol. 22, No. 5, Oct. 1979, pp. 2103–2105.

Primary Examiner—Thomas G. Black
Assistant Examiner—Maria N. Von Buhr
Attorney, Agent, or Firm—Fitzpatrick, Cella, Harper & Scinto

[57] ABSTRACT

A word processor having an arithmetic operation function has a character key keyboard for entering characters and numeric data and a function key keyboard for entering functions including operator codes of arithmetic operations. A numeral data to be arithmetically operated on is entered by the character key keyboard together with an operator code representative of an arithmetic operation to be executed on that numeric data, and the numeric data and the operator code are stored in a memory and displayed on a CRT screen so that the arithmetic operation required for the numeric data is identified on the CRT screen.

14 Claims, 19 Drawing Sheets

U.S. PATENT DOCUMENTS

| | | | |
|---|---|---|---|
| 4,386,412 | 5/1983 | Ito | 364/710 |
| 4,389,641 | 6/1983 | Nakanishi et al. | 340/709 |
| 4,412,300 | 10/1983 | Watson et al. | 364/200 |
| 4,416,558 | 11/1983 | McInroy et al. | 364/900 X |
| 4,509,138 | 4/1985 | Hayashi et al. | 364/900 |
| 4,527,917 | 7/1985 | Ueno | 400/78 |
| 4,530,068 | 7/1985 | Nakanishi et al. | 364/705 |
| 4,548,520 | 10/1985 | Ueno | 400/63 |
| 4,553,219 | 11/1985 | Ueno | 400/80 |
| 4,577,982 | 3/1986 | Sasaki | 400/279 |
| 4,609,918 | 9/1986 | Nakanishi et al. | 364/518 |
| 4,615,015 | 9/1986 | Olander, Jr. et al. | 364/200 |
| 4,615,629 | 10/1986 | Power | 400/486 |
| 4,624,587 | 11/1986 | Ueno | 400/83 |
| 4,627,748 | 12/1986 | Mizuno et al. | 400/110 |
| 4,782,462 | 11/1988 | Kaplinsky et al. | 364/900 |

⊕ 1 2 3 ⊕ 4 5 6 ⊜ ⟶ 1 2 3 + 4 5 6 =

⊕ 1 2 3 ⊖ 4 5 6 ⊜ ⟶ 1 2 3 − 4 5 6 =

⊕ 4 3 ⊗ 2 1 ⊜ ⟶ 4 3 × 2 1 =

⊕ 4 3 ⊘ 2 1 ⊜ ⟶ 4 3 ÷ 2 1 =

⊕ 4 3 ⊘% 2 1 ⊜ ⟶ 4 3 × 0.2 1 =

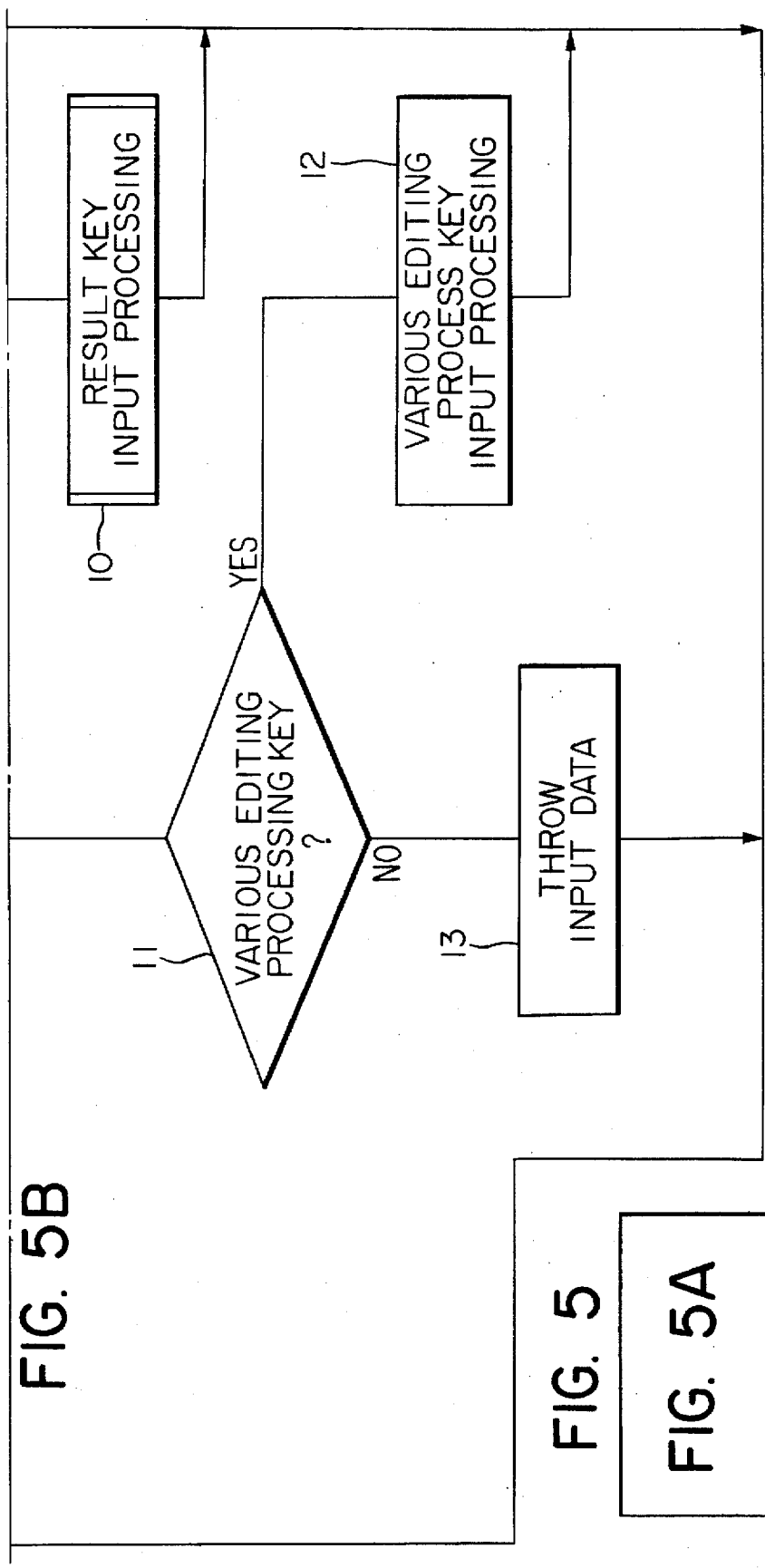

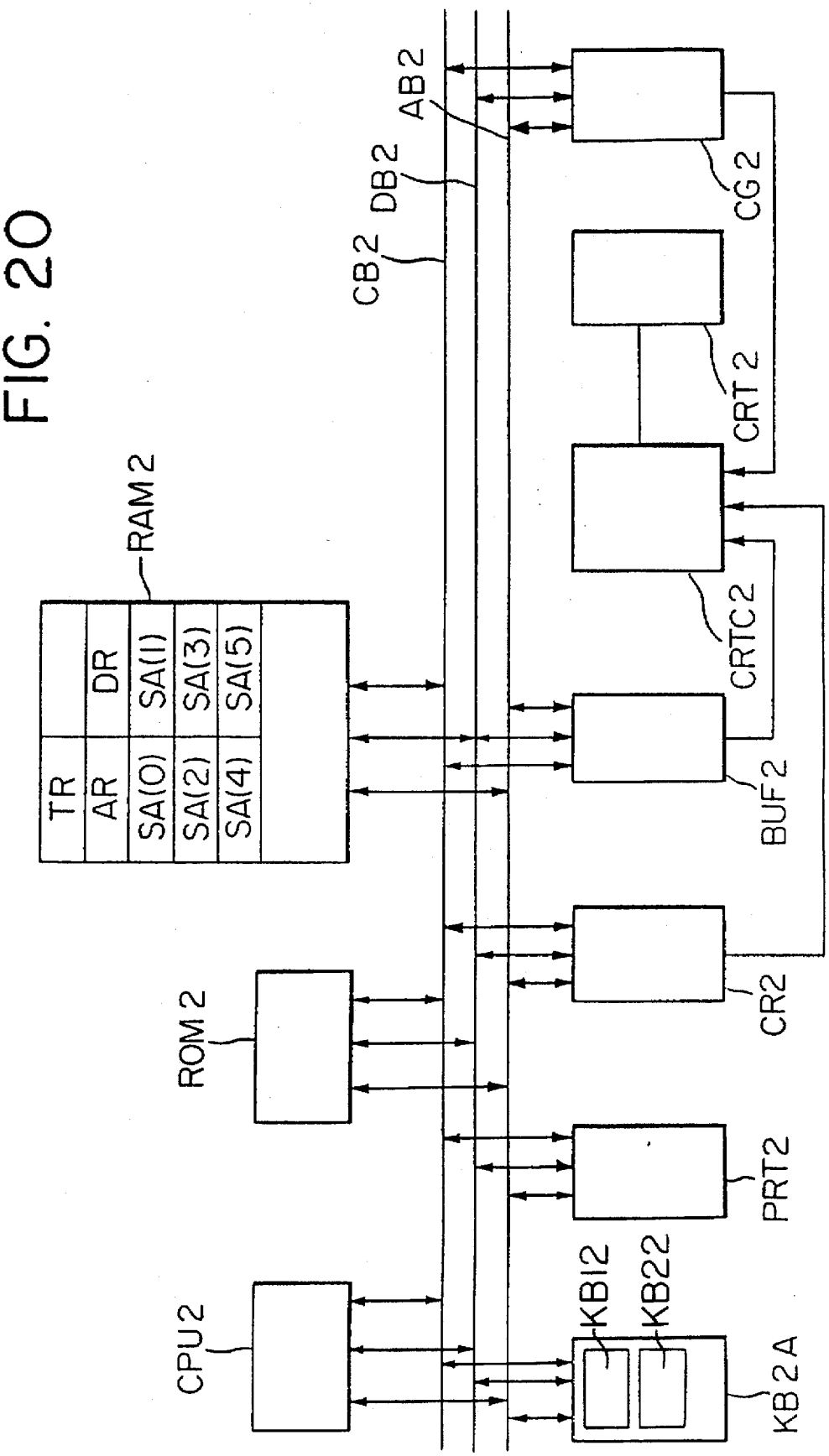

⊕123 ⊕456 ⊜ ⟶ 123+456 =

⊕123 ⊖456 ⊜ ⟶ 123−456 =

⊕43 ⊗21 ⊜ ⟶ 43×21 =

⊕43 ⊘21 ⊜ ⟶ 43÷21 =

⊕43 ⊛21 ⊜ ⟶ 43×0.21 =

INFORMATION PROCESSING SYSTEM, A PROCESSOR, AND AN INFORMATION PROCESSING METHOD FOR THE PERFORMING OF AN ARITHMETIC OPERATION OF NUMERIC INFORMATION

This application is a continuation of application Ser. No. 07/745,967 filed Aug. 12, 1991, now abandoned, which is a continuation of application Ser. No. 267,615, filed Nov. 2, 1988, now abandoned, which is a continuation of application Ser. No. 789,925, filed Oct. 21, 1985, now abandoned, which is a continuation of application Ser. No. 377,676, filed May 12, 1982, now abandoned.

BACKGROUND OF THE INVENTION

1. Field of the Invention

The present invention relates to a word processor, and more particularly to a word processor having an arithmetic operation function.

2. Description of the Prior Art

In a prior art word processor, a cursor is added to numeric data to be used for an arithmetic operation in order to distinguish it from other numeric data, and the arithmetic operation for that numeric data is specified by a function key to carry out the arithmetic operation in a sentence. In such a prior art system, the arithmetic operation for the adjacent numeric data is not displayed on a cathode ray tube (CRT). Accordingly, when an operator code is inputted by the function key, it is difficult to detect misoperation. This increases the burden on a user who operates the function key.

A word processor having means for carrying out an arithmetic operation for numeric data in a document being composed has been known. In such a prior art word processor having the arithmetic operation means, numeric data to be used in the arithmetic operation is designated by a cursor in order to distinguish it from other data, and the arithmetic operation for that numeric data is specified by a function key. In order to designate the numeric data to be used in the arithmetic operation, the cursor is continuously moved from a current position to the position of that numeric data (for example, a right end of the numeric data) and then the function key for specifying a desired arithmetic operation is depressed. In this system, however, since the cursor is sequentially shifted from position to position, it is not possible to directly designate the numeric data. In addition, since the arithmetic operation for the adjacent numeric data is not displayed on a display screen, a user must pay attention to misoperation when he or she depresses the function key to specify the arithmetic operation.

A word processor has been proposed in which a tabulation signal for designating numeric data is preset and tabulation is carried out when the numeric data to be used in the arithmetic operation is to be designated.

In such a word processor, the inconvenience encountered in shifting the cursor one position by one position by depressing the cursor key when the numeric data is to be designated is overcome, but the number of times of tabulation is large when a large number of numerals such as a numeric list are to be processed. This increases the burden on the user.

SUMMARY OF THE INVENTION

It is an object of the present invention to provide a word processor which displays on a CRT screen an operator symbol for specifying an arithmetic operation when such an operator code is inputted together with numeric data so that a user of the word processor can confirm the arithmetic operation for the adjacent numeric data on the CRT screen in order to efficiently proceed with the arithmetic operation with a simple manipulation.

It is another object of the present invention to provide a word processor which efficiently proceeds with an arithmetic operation on numeric data in a document to reduce a burden to a user when he or she inputs the numeric data.

It is another object of the present invention to provide a word processor in which an operator code for indicating a predetermined arithmetic operation function is added to a numeric data to be used in the arithmetic operation and an operator code for indicating a storage position is set to a storage position of an operation result so that the arithmetic operation for the adjacent numeric data and the storage position of the operation result can be confirmed by watching a display screen.

It is another object of the present invention to provide a word processor which designates a row to be arithmetically operated on and carries out an arithmetic operation on one row at a time based on a previously set operator without designating numeric data to be used in the arithmetic operation one by one.

It is another object of the present invention to provide a word processor in which a tabulation code for designating numeric data may be entered and tabulation to that numeric data is carried out when that numeric data used in an arithmetic operation is to be designated so that the inconvenience encountered in the prior art system in shifting the cursor one position by one position with the cursor key is overcome.

It is another object of the present invention to provide a word processor in which a tabulation code for designating numeric data has a function of an operator so that an arithmetic operation for the numeric data can be identified on a display screen to facilitate the operation.

It is another object of the present invention to provide a word processor comprising input means for inputting characters and numeric data, processing means for executing a processing operation in accordance with the data entered by the input means, memory means for storing therein the data entered by the input means and a result if the processing operation is executed by the processing means, tabulation code input means for entering a tabulation code to be added to the numeric data entered by the input means, instruction means for initiating a search for the tabulation code, arithmetic operation means for executing an arithmetic operation in accordance with the content of the tabulation code, and buffer means for temporarily storing a result of the arithmetic operation.

BRIEF DESCRIPTION OF THE DRAWINGS

FIG. 5, shows how FIGS. 5A and 5B are assembled to form a flow chart of processing of information by the word processor of the first embodiment of the present invention;

FIG. 20 is a block diagram of the basic system architecture of a third embodiment of the word processor of the present invention;

DETAILED DESCRIPTION OF THE PREFERRED EMBODIMENTS

Figure 1:
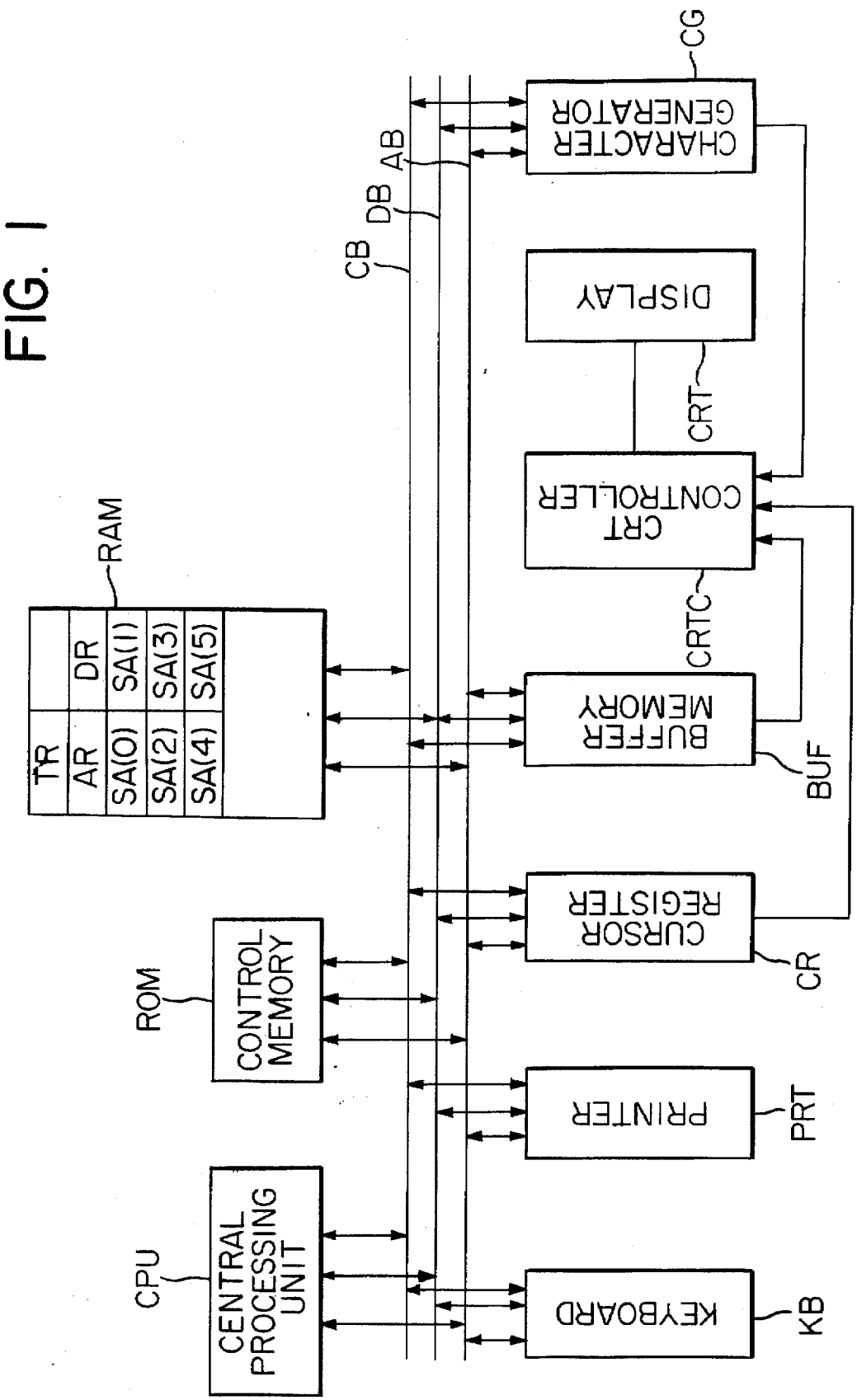
FIG. 1 is a block diagram of the basic system architecture of a first embodiment of the word processor of the present invention.

FIG. 1 shows one embodiment of the present invention, in which CPU denotes a central processing unit for carrying out arithmetic and logic operations, and controls devices connected to an address bus AB, a control bus CB and a data bus DB, through those buses. The address bus AB transfers signals for specifying items to be controlled; the control bus supplies control signals to the items to be controlled; and the data bus transfers data. ROM denotes a control read-only memory which stores therein control sequences shown in FIGS. 5–10, and RAM denotes a random access memory for temporarily storing data therein. In the present embodiment, the random access memory RAM has an operator code register TR for storing an operator code, an accumulator register AR for accumulating operation results, a data register DR for storing new input data, and stack areas SA(0) –SA(5). KB denotes a keyboard having keys for entering characters, numeric data and operator codes.

Figure 2:
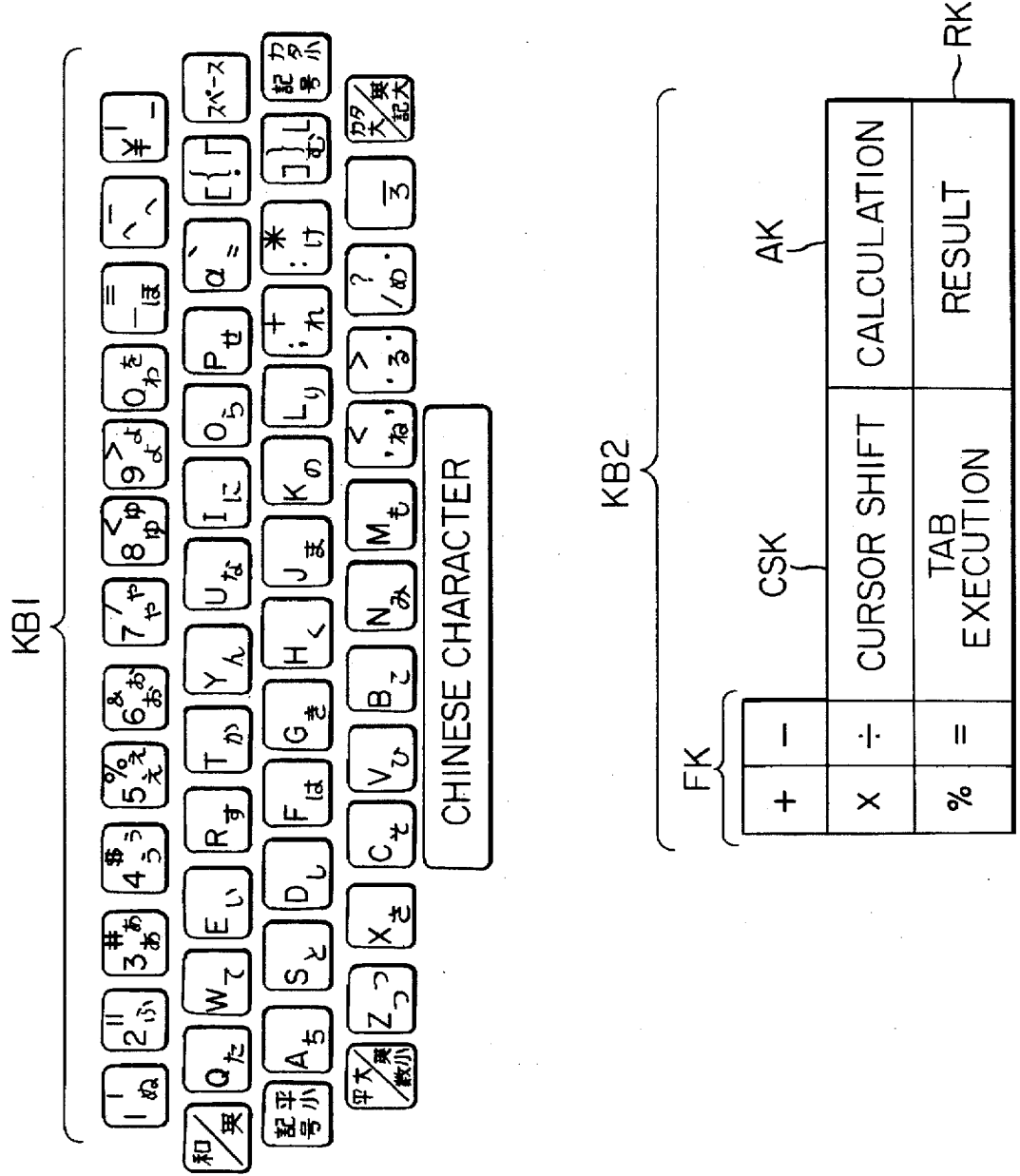
FIG. 2 shows a detail of a keyboard shown in FIG. 1.

As shown in FIG. 2, the keyboard KB has character key keyboard KB1 and function key keyboard KB2. The character key keyboard KB1 is used to enter characters. For example, when a KANJI character (chinese character) is to be entered, a phonetic representation thereof is entered by KANA characters and a KANJI designation key CHINESE CHARACTER is depressed to indicate that those KANA characters represent the KANJI character so that KANA--KANJI conversion is carried out. (It will be understood that certain characters shown in the figures are merely illustrative and may not represent actual KANA or KANJI characters). The function key keyboard KB2 has a cursor shift key CSK, operator keys FK (+, −, ×, ÷, %, =), a calculation key AK and a result key RK.

Referring again to FIG. 1, CR denotes a cursor register, which can be read and written by the central processing unit CPU. A cursor is displayed on a display device CRT at a position corresponding to an address stored in the cursor register CR, under the control of a CRT controller CRTC to be described later. The information stored in the cursor register CR is one of serial numbers 0–31, and the CRT controller CRTC converts the serial number to a row number and a column number for display. BUF denotes a buffer memory having a 32-word capacity for storing therein document information entered from the keyboard KB. The content of the buffer memory BUF is represented by B(N) which corresponds to the content of the buffer at address N, where N is 0, 1, . . . 31.

Figures 3, 4:
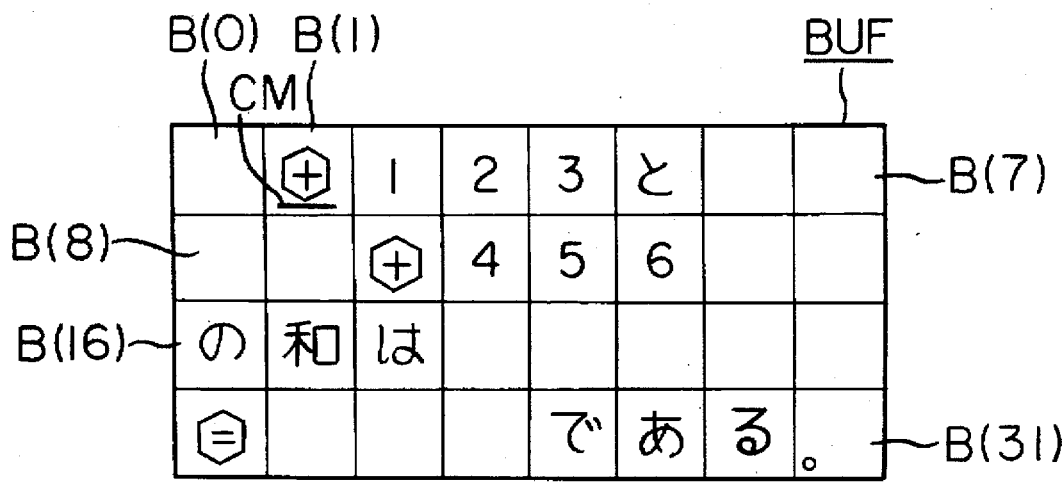
FIG. 3 shows a detail of a buffer memory shown in FIG. 1.
FIG. 4 shows a diagram for explaining a relation between an operator code and an actual mathematical formula.

CRTC denotes the CRT controller for displaying the contents of the cursor register CR and the buffer memory BUF on the display CRT. As shown in FIG. 3, the content of the buffer memory BUF is represented by a matrix of four rows by eight columns and data in each cell of the matrix is represented by B(0), B(1), . . . , B(31). A cursor CM is displayed at row and column positions specified by the content of the cursor register CR. Referring again to FIG. 1, CRT denotes a four-row, eight-column display device for displaying characters and the cursor under the control of the CRT controller CRTC. CG denotes a character generator for generating character code signals to be supplied to the display CRT or to a printer PRT, which prints out information stored in the buffer memory BUF.

The operation of the present embodiment thus constructed is now explained.

In the present embodiment, when power is turned on, the contents of the cursor register CR and the buffer memory BUF are cleared, the cursor CM is displayed at a home position B(0) (see FIG. 3), and a display screen is cleared to be ready for input from the keyboard KB.

In the following description, it is assumed that a user enters a sentence shown in FIG. 3. A character is entered by shifting the cursor CM to a desired position by the cursor shift key CSK and depressing the corresponding character key. When a sentence including KANA characters and KANJI characters are to be entered, a KANJI character is entered by KANA character keys, which is then converted to the corresponding KANJI character by a well known KANA–KANJI conversion technique. The KANJI characters may be entered from multi-shift keys or tablet keys.

Numeric data to be arithmetically operated upon is entered by first depressing an operator key FK to set an operator code. The processor CPU handles a series of numerals following the operator as one numeric data. In the present embodiment, the data in the processor CPU is handled as a 16-bit integer. As described above, there are six operator codes. By depressing one of operator keys FK (+, −, ×, ÷, %, =) of the function keys KB2, a corresponding one of the operator codes ⊕, ⊖, ⊗, ⊘, ⊛ and ⊜ is displayed on the CRT screen. They represent addition, subtraction, multiplication, division, percent and equal, respectively. A relation between the operator symbols displayed on the CRT screen and an actual mathematical formula is shown in FIG. 4. After the numerals and the operator codes have been entered, the arithmetic operation is carried out in the following steps.

Step 1: The cursor CM is shifted to the position of the operator by the cursor shift key CSK.

Step 2: When the numeric data is to be arithmetically operated on the calculation key AK is depressed. Then the numeric data is stored in the data register DR and the content of the data register DR and the content of the accumulator register AR are arithmetically operated on in accordance with the content of the input operator code. An operation result is stored in the accumulator register AR.

Step 3: The cursor CM is shifted to the position of the next operator symbol by the cursor shift key CSK. When the numeric data is to be arithmetically operated on, the calculation key AK is depressed and the arithmetic operation is carried out in a similar manner.

Step 4: The cursor CM is shifted to a position where it is desired to display a result, and the result key RK is depressed. Thus, the result stored in the accumulator register AR is displayed at positions following to the cursor position which is now at the position of ⊜. After the operation result has been displayed, the content of the accumulator register AR is cleared. The position where it is desired to display the operation result is usually represented by the operator symbol ⊜ although the operator code is not always necessary.

Figure 5A:
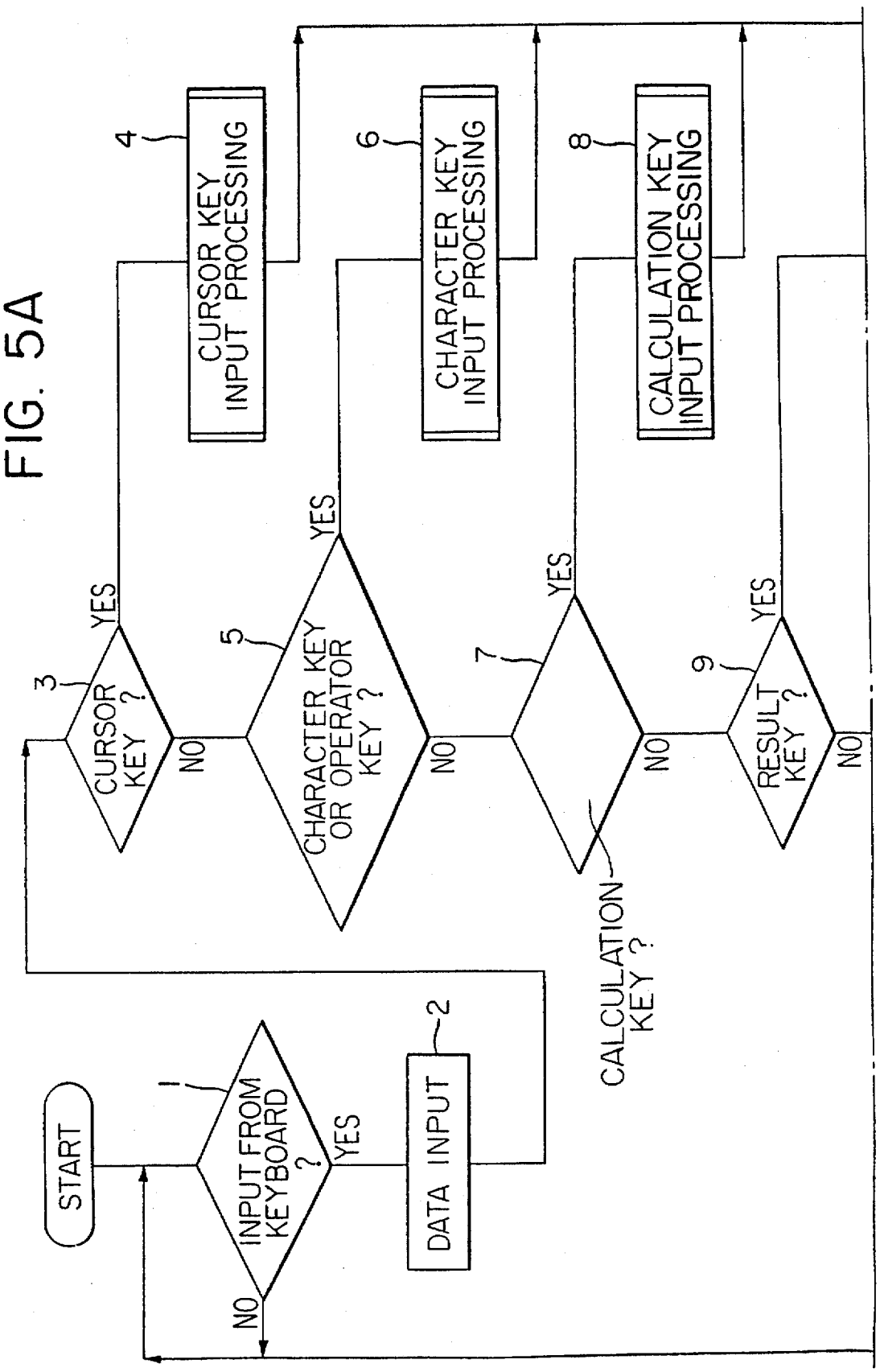

The above steps are explained in further detail with reference to a flow chart shown in FIG. 5.

After power-on, initialization is carried out and the process waits for an input from the keyboard KB. When the keys are depressed, the input from the keyboard KB is checked in a step 1. If no input is entered, the process waits for the input from the keyboard KB, and if the input is entered, the process goes to a step 2. In the step 2, the data from the keyboard KB is read in. In a step 3, if the input data is data from the cursor shift key CSK, the process goes to a step 4, and if not the process goes to a step 5. In the step 4, the input processing for the cursor shift key CSK is carried out as will be described in detail later. In the step 5, if the input data is data from a character key or the operator key FK, the process goes to a step 6 to carry out the input processing for the character key as will be described in detail later. In the step 5, if input data is not the data from the character keys or the operator key FK, the process goes to a step 7. In the step 7, if the input data is a data from the calculation key AK, the process goes to a step 8, and if not, the process goes to a step 9. The input processing for the calculation key AK in the step 8 will be described later. In the step 9, if the input data is a data from the result key RK, the process goes to a step 10, and if not, the process goes to a step 11. The input processing for the result key RK in the step 10 will be described later. In the step 11, if the input data is a data from an edition key (not shown), the process goes to a step 12 to carry out the input processing for the edition key. For example, sentence data already composed may be corrected. In the step 11, if the input data is not the data from the edition key, the process goes to a step 13 in which it is determined that the input data is invalid and the input data is cleared.

Figure 6:
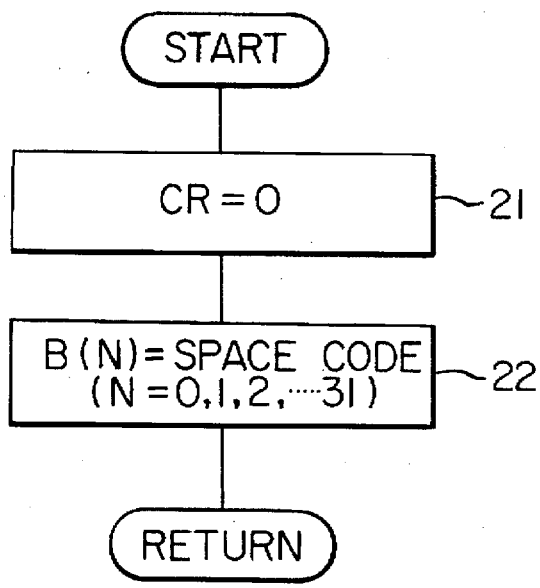
FIG. 6 is a flow chart showing an initialization process for the word processor of the present invention.

The initialization steps are now explained with reference to FIG. 6.

In a step 21, the content of the cursor register CR is reset to "0". In a step 22, all areas of the buffer memory BUF are filled with space codes to clear the CRT screen.

Figure 7:
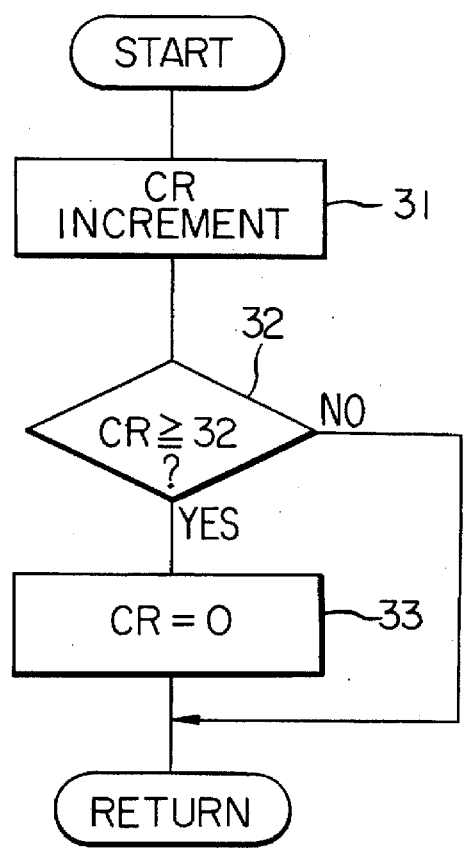
FIG. 7 is a flow chart showing processing in response to actuation of a cursor key.

The cursor key input processing in the step 4 is explained with reference to FIG. 7.

In a step 31, the content of the cursor register CR is incremented by one. In a step 32, if $CR \geq 32$, the process goes to a step 33 to reset the content of the cursor register CR to "0", and if not, the process goes back to the main routine.

Figure 8:
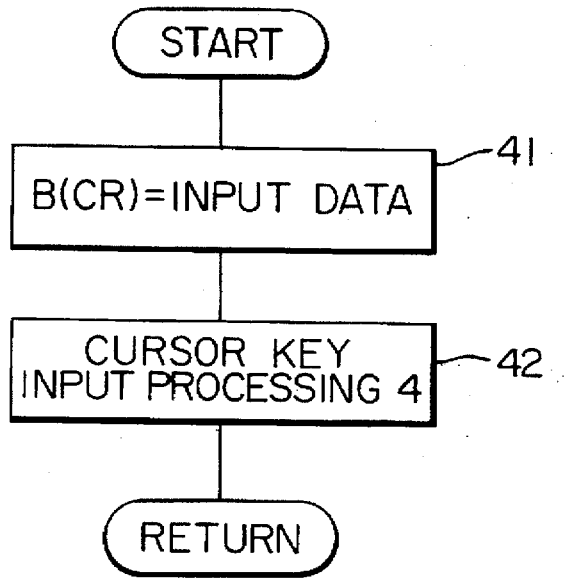
FIG. 8 is a flow chart showing processing in response to actuation of character keys.

The character key input processing in the step 6 is explained with reference to FIG. 8.

In a step 41, the input data code is written into the buffer memory BUF at the data address corresponding to the content of the cursor register CR [B(CR)=input data] to display the input data at the cursor position on the CRT screen. In a step 42, the cursor key input processing described above is carried out to increment the cursor position by one.

Figure 9:
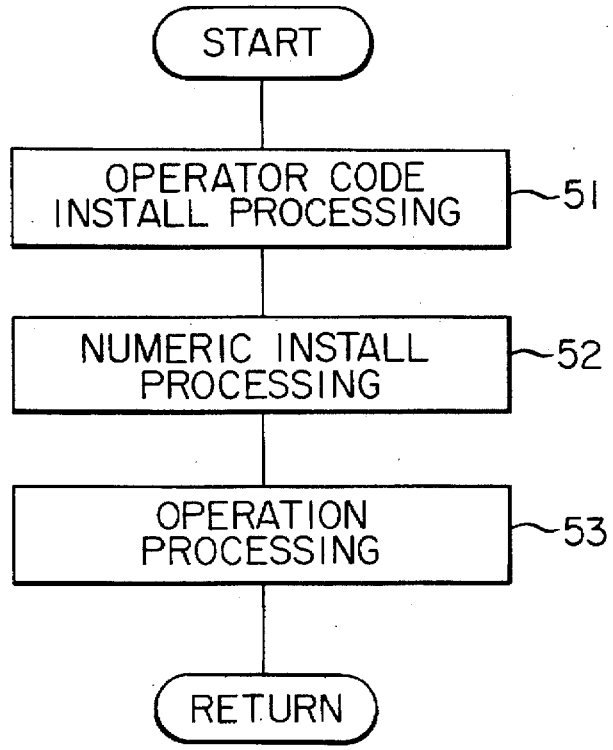
FIG. 9 is a flow chart showing processing in response to actuation of calculation keys.

The calculation key input processing in the step 8 is explained with reference to FIG. 9.

In a step 51, the operator code at the cursor position is read from the buffer memory BUF into the operator code register TR. If the data is not the operator code in the step 51, the process goes back to the step 1 shown in FIG. 5. In a step 52, the next address to that of the operator code stored in the buffer memory BUF is retrieved and the numeric data is read in sequentially and stored in the stack area SA. If the data is not the numeric data in the step 52, the process returns to the step 1. This operation is repeated until the numeric data is interrupted. The stack area is divided into six stages SA(0)–SA(5). If more than six numeric data are read in, the first read data is pushed out. The numeric data stored in the stack area SA are read out in a last-in first-out manner, and they are converted to binary numbers in a well known technique. The converted binary numbers are stored in the data register DR. In a step 53, the contents of the data register DR and the accumulator register AR are arithmetically operated on in accordance with the operator code stored in the operator code register TR, and the operation result is stored in the accumulator register AR. In the division and percent operations, fractions are thrown away and an overflow processing is not carried out.

Figure 10:
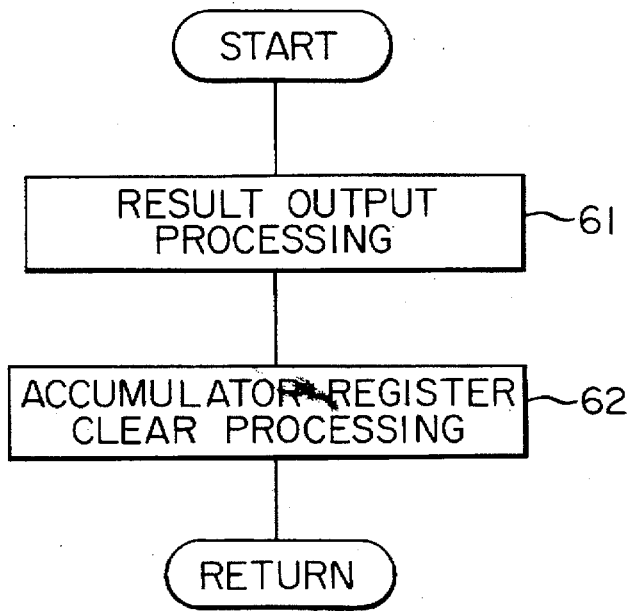
FIG. 10 is a flow chart showing processing in response to actuation of a result key.

The result key input processing in the step 10 is explained with reference to FIG. 10.

In a step 61, the content of the accumulator register AR is converted to a decimal number by a well known technique and a coded decimal number is temporarily stored in the stack area SA. The data is transferred positions following to the cursor position in the buffer memory BUF to display the operation result on the CRT screen. In a step 62, the content of the accumulator register AR is cleared.

While the operator keys FK are used to set the operator codes in the present embodiment, other function keys (control keys) on the function keyboard KB2 and the character keys may be simultaneously depressed to set the operator code.

While the data register DR and the address register can handle only the 16-bit integers in the present embodiment, they may handle 32-bit integers by expanding the stack area or a floating decimal point system may be used to handle decimals to attain high precision calculation.

As described hereinabove, according to the present invention, in the word processor with an arithmetic operation function of the invention, the numeric data is entered together with the operator code representing the arithmetic operation and the numeric data is displayed on the CRT screen together with the operator symbol representing the operator code. Accordingly, the user of the word processor can proceed with the operation while confirming the arithmetic operation for the numeric data and operability and efficiency are greatly improved.

Figure 11:
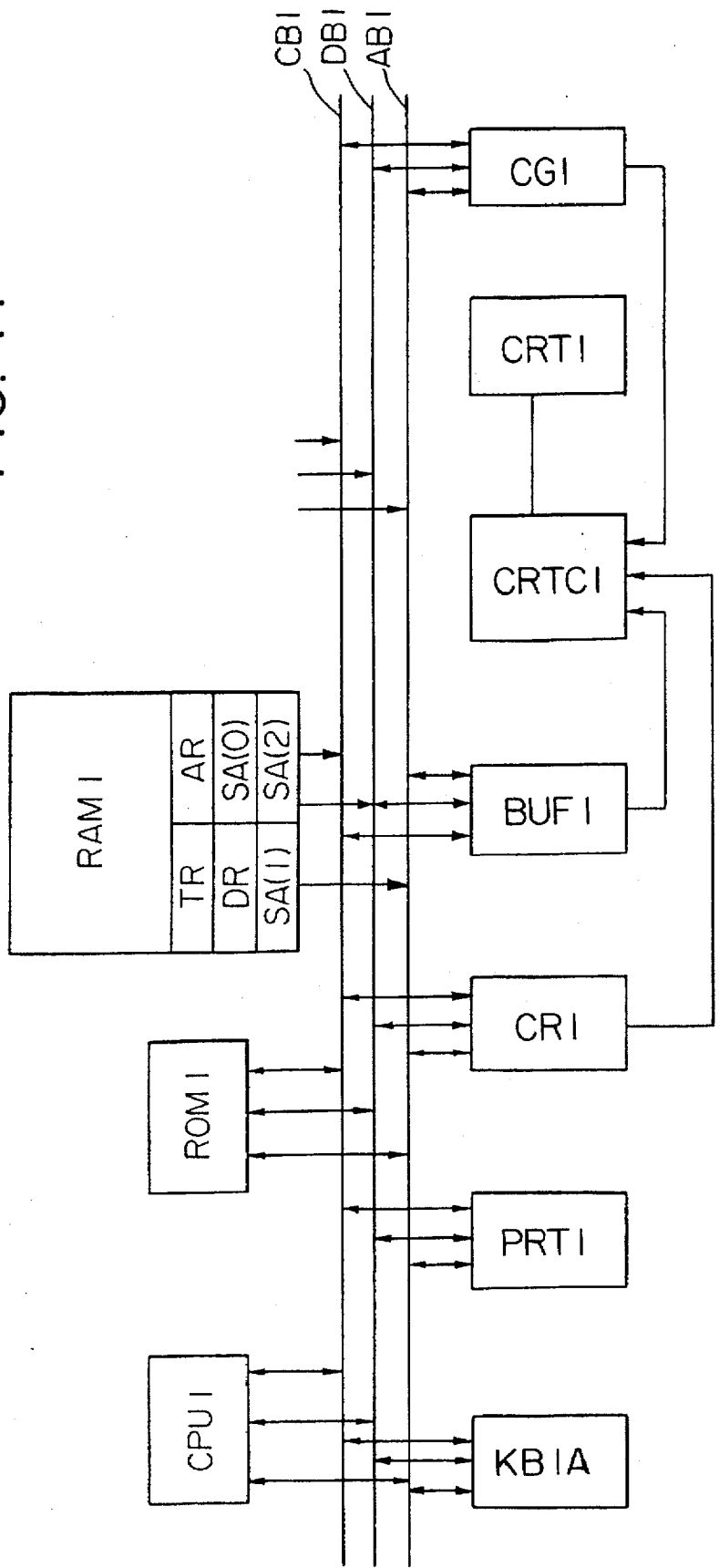
FIG. 11 is a block diagram of the basic system architecture of a second embodiment of the word processor of the present invention.

FIG. 11 shows a block diagram of another embodiment of the present invention. CPU1 denotes a microprocessor which carries out arithmetic and logical operations, and controls devices connected to an address bus AB1, a control bus CB1 and a data bus DB1, through those buses. The address bus AB1 transfers signals for specifying items to be controlled. The control bus CB1 supplies control signals to the items to be controlled. The data bus DB1 transfers data. ROM1 denotes a control memory which stores therein control steps shown in FIGS. 15–19. RAM1 denotes a random access memory which temporarily stores data therein. It may comprise an operator code register TR for storing an operator code, an accumulator register AR for accumulating operation results, a data register DR for storing new input data and stack areas SA(0)–SA(2).

KB1A denotes a keyboard having keys for entering data to the word processor. The keyboard KB1A comprises a character key keyboard KB11 and function key keyboard KB21.

Figure 12:
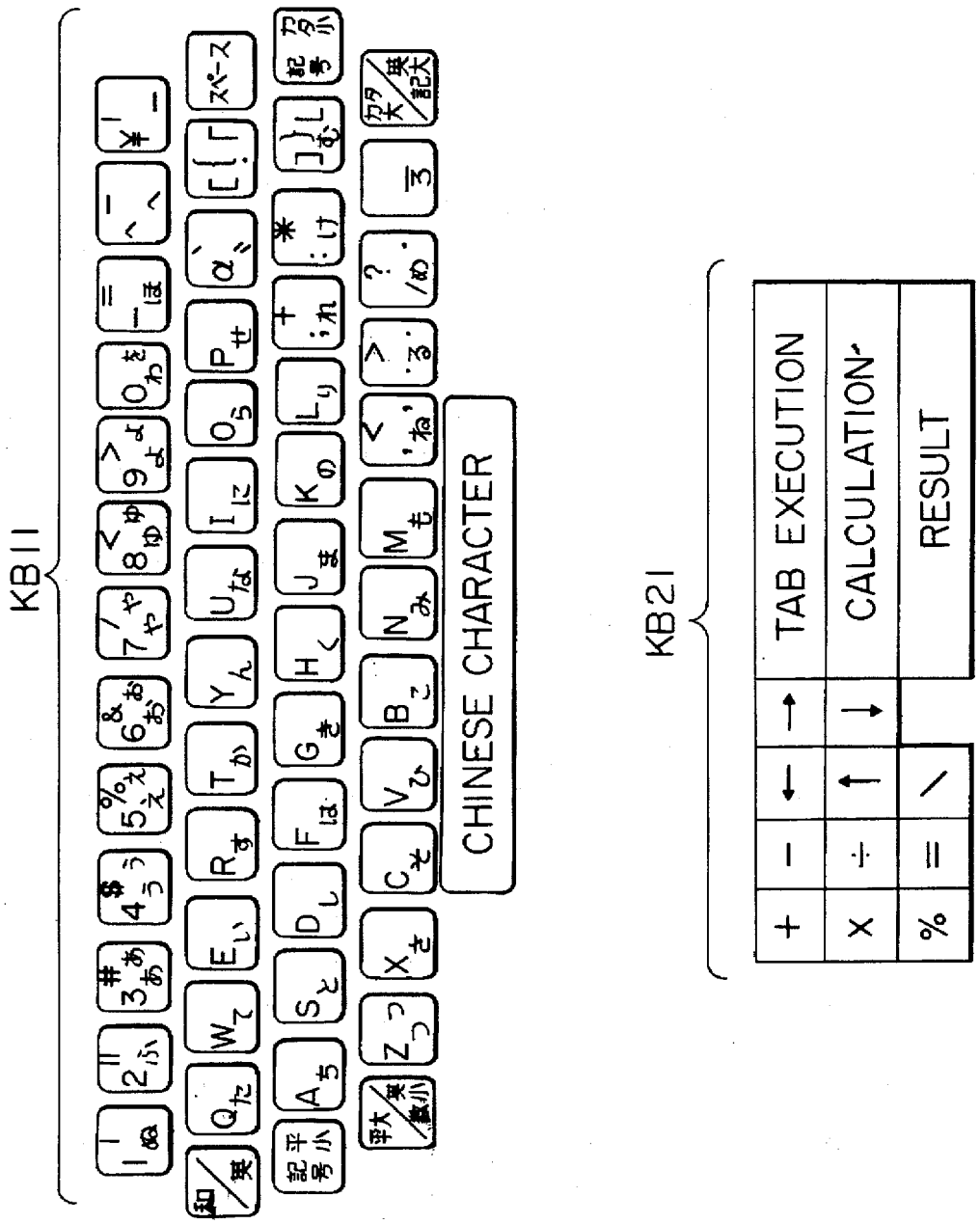
FIG. 12 shows a detail of a keyboard shown in FIG. 11.

FIG. 12 shows a detail of the keyboard KB1. The character key keyboard KB11 has keys for entering characters. A KANJI character is entered by entering a phonetic representation thereof by with KANA keys together with a KANJI designation key CHINESE CHARACTER for indicating that the input KANA characters represent the KANJI character. (Again, it will be understood that certain characters shown in the figures are merely illustrative and may not represent actual KANA or KANJI characters.) The function key keyboard KB21 has cursor shift keys, six operator keys (+, −, ×, ÷, %, =), a tabulation key, a calculation key, and a result key.

Referring again to FIG. 11, CR1 denotes a cursor register which can be read and written by the microprocessor CPU1. A cursor is displayed on a display CRT1 at a position corresponding to the address stored in the cursor register CR1 under the control of a CRT controller CRTC1 to be described later. The information stored in the cursor register CR1 is one of serial numbers 0–55. The CRT controller CRTC1 converts the serial number to a row number and column number for display.

BUF1 denotes a buffer memory having a 56-word capacity and stores therein document information entered from the keyboard KB1. The content of the buffer memory BUF1 is represented by B(N) in the following description. That is, B(N) represents the content of the buffer memory BUF1 at address N, where N is 0, 1, . . . , 55.

Figures 13, 14:
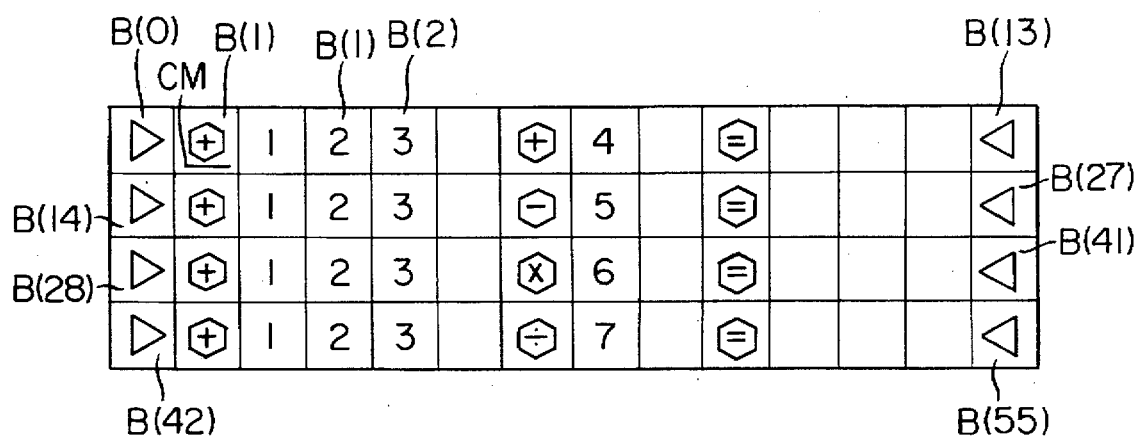
FIG. 13 shows a detail of a buffer memory.
FIG. 14 shows a diagram for explaining a relation between an operator code and an actual mathematical formula.

The CRT controller CRTC1 functions to display the contents of the cursor register CR1 and the buffer memory BUF1 on the display CRT1. The content of the buffer memory BUF1 is displayed on the display CRT1 in a matrix of four rows by 12 columns. The relation between the data arrangement in the buffer memory BUF1 and the display on the CRT screen is shown in FIG. 13 by B(0), B(1), B(2), . . . The cursor CM is displayed at a row and a column specified by the content of the cursor register CR1. It is displayed by referring to a character generator CG1 to be described later.

The display CRT1 is a 4-row by 12-column display which displays the characters and the cursor under the control of the CRT controller CRTC1.

The character generator CG1 generates character codes for the characters to be displayed on the display CRT1 or to be printed out by a printer PRT1, which prints out the information stored in the buffer memory BUF1.

The operation of the present embodiment thus constructed is now explained. Terms are defined as follows.

1. Left margin mark LMM

It is displayed on the CRT screen by a mark '△'. It indicates the leftmost position permitted for the keyboard entry.

2. Right margin mark RMM

It is displayed on the CRT screen by a mark '△'. It indicates the rightmost position permitted for the keyboard entry.

In the present embodiment, when power is turned on, the memories such as the registers and the buffer are automatically cleared, the cursor is shifted to a home position B(1), and the left and right margin marks LMM and RMM are displayed on the display CRT1. Other data are cleared to be ready for the keyboard operation.

After power-on, a user enters characters as shown in FIG. 13. The KANJI character is entered by shifting the cursor to a desired position with the cursor shift key CSK and depressing the character key. In the KANA-KANJI conversion system, the KANA characters are entered and they are converted to the KANJI character by a well known technique. The KANJI character also may be entered by a tablet keyboard or a multi-shift keyboard.

The numeric data to be arithmetically operated on is entered together with the depression of the operator key to set the operator code. The microprocessor CPU1 handles a series of numeric data following the operator as one data.

In the present embodiment, the data is represented by a 16-bit integer.

Six operator codes are used. By depressing the operator keys ⊞, ⊟, ⊠, ⊡, ⊠ or ⊟, of the keyboard KB21 a corresponding operator symbol ⊕, ⊖, ⊗, ⊙, ⊛ or ⊜ is displayed on the CRT screen, which represents addition, subtraction, multiplication, division, percentage or equal, respectively.

A relation between the tabulation on the CRT screen and an actual mathematical formula is shown in FIG. 14. After the operator code is added to the numeric data to define the arithmetic operation, the mark operator code ⊜ is set to a position where the operation result is to be displayed.

Then, the cursor is shifted to the right (or left) margin position. By depressing a key RESULT, the operator code and the numeric data are read in starting from the start position of the row and the arithmetic operation is carried out in accordance with the content of the operator code and the operation result is stored in the accumulator AR. The content of the accumulator register AR is displayed at the positions following the operator code ⊜. The power is turned on and the initialization process is carried out to be ready for the keyboard operation.

Figure 15:
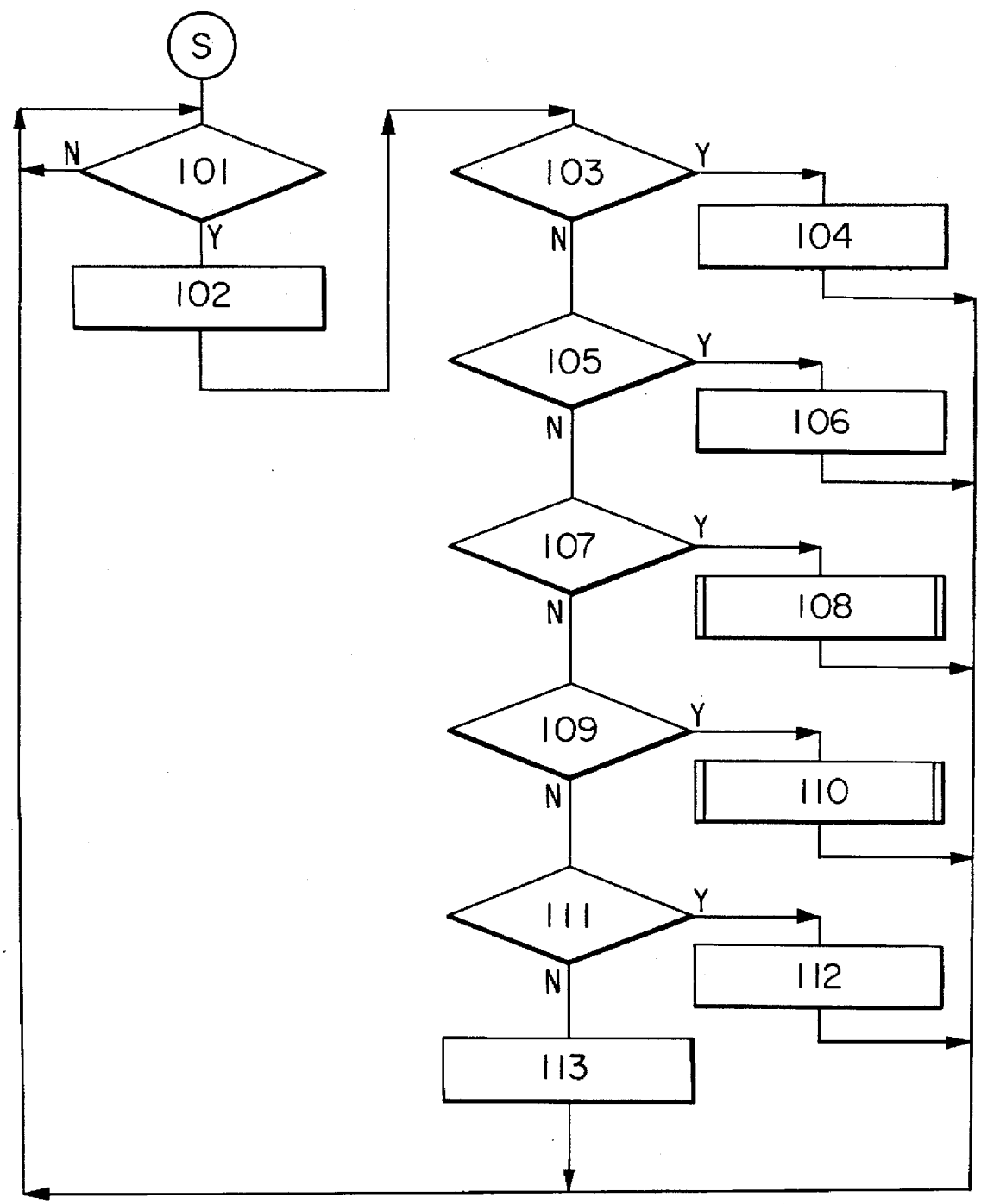
FIG. 15 is a flow chart of processing of information by the word processor of the second embodiment of the present invention.

When a key on the keyboard KB1A is depressed, the following steps are executed, which are now explained with reference to FIG. 15.

101. Is a data entered from the keyboard KB1A?
102. Read in the data
103. Is the data entered from the cursor key?
104. Execute cursor key input processing.
105. Is the data entered from the character key or operator key?
106. Execute character key input processing or operator key input processing.
107. Is the data entered from the calculation key?
108. Execute calculation key input processing.
109. Is the data entered from the result key?
110. Execute result key input processing.
111. Is the data entered from the edition key?
112. Execute edition key input processing.
113. Clear the input data.

The above steps are now explained in further detail. In the step 101, the input from the keyboard KB1A is checked. If no input is entered, the process waits for the input from the keyboard KB1A. If the input is entered, the process goes to the step 102, in which the data is read from the keyboard KB1A. In the step 103, if the input data is a data from the cursor shift key, the process goes to the step 104, and if not, the process goes to the step 105. In the step 104, the cursor CM is shifted on the CRT screen in accordance with the input data from the cursor shift key. Thereafter, the process waits for the next key input. In the step 105, if the input data is a data from the character key or the operator key, the process goes to the step 106, and if not, the process goes to the step 107. In the step 106, the input character is displayed at the position of the cursor CM. However, if the content of the cursor register CR1 indicates that the cursor is at the margin position, the input data is rejected. In the step 107, if the input data is a data from the calculation key, the process goes to the step 108, and if not, the process goes to the step 109. The calculation key input processing in the step 108 will be described in detail later. In the step 109, if the input data is a data from the result key, the process goes to the step 110, and if not, the process goes to the step 111. The result key input processing will be explained later. In the step 111, if the input data is a data from an edition key (not shown), the process goes to the step 112, and if not, the process goes to the step 113. In the step 112, the edition key input processing is executed. For example, document data already composed may be corrected. In the step 113, it is determined that the input data is invalid, and the input data is cleared.

Figure 16:
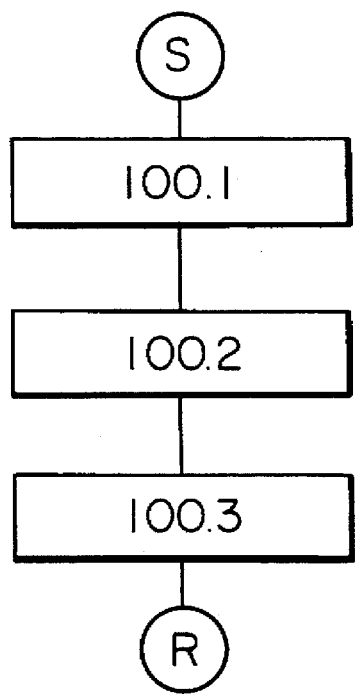
FIG. 16 is a flow chart showing an initialization process of the second embodiment.

The initialization process comprises three steps as shown in FIG. 16.
100.1. CR=1
100.2. B(N)=space code (N=0, 1, 2, . . . , 55)
100.3. B(I)=margin code (I=0, 13, 14, 27, 28, 41, 42, 55)

In the step 100.1, the content of the cursor register CR is reset to "0". In the step 100.2, the memory buffer BUF1 is filled with the space codes to clear the CRT screen. In the step 100.3, the margin codes are inserted to the margin positions to display the left and right margins on the CRT screen.

Figure 17:
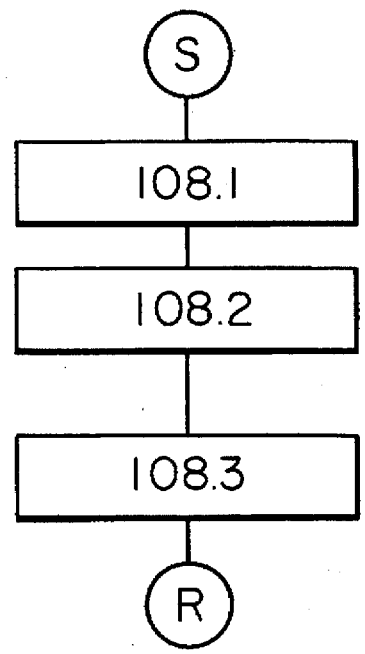
FIG. 17 is a flow chart showing processing in response to actuation of a calculation key.

The calculation key input processing in the step 108 is explained with reference to FIG. 17.
108.1. Read in the operator code.
108.2. Read in the numeric data.
108.3. Carry out the arithmetic operation.

In the step 108.1, the operator code at the cursor position is read from the buffer memory BUF1 into the operator code register TR. If it is a code other than the operator codes ⊕, ⊖, ⊗, ⊙ and ⓢ, the process returns to the start point. In the step 108.2, the next position to that of the operator code in the buffer BUF1 is retrieved and the numeric data is sequentially read into the stack areas SA. A pointer BP in the buffer BUF1 is incremented each time when the operator code or numeric data is read in. If the first code retrieved is other than the numeric data, the process returns to the start point. The numeric data is retrieved until the numeric data interrupted. The stack area SA has three stages SA(0)–SA(2). If more than three numeric data are read in, the first-in data are pushed out. The numeric data stored in the stack area SA are read out in a last-in first-out manner and the data are converted to binary numbers in a known technique and the binary numbers are stored in the data register DR.

Figure 18:
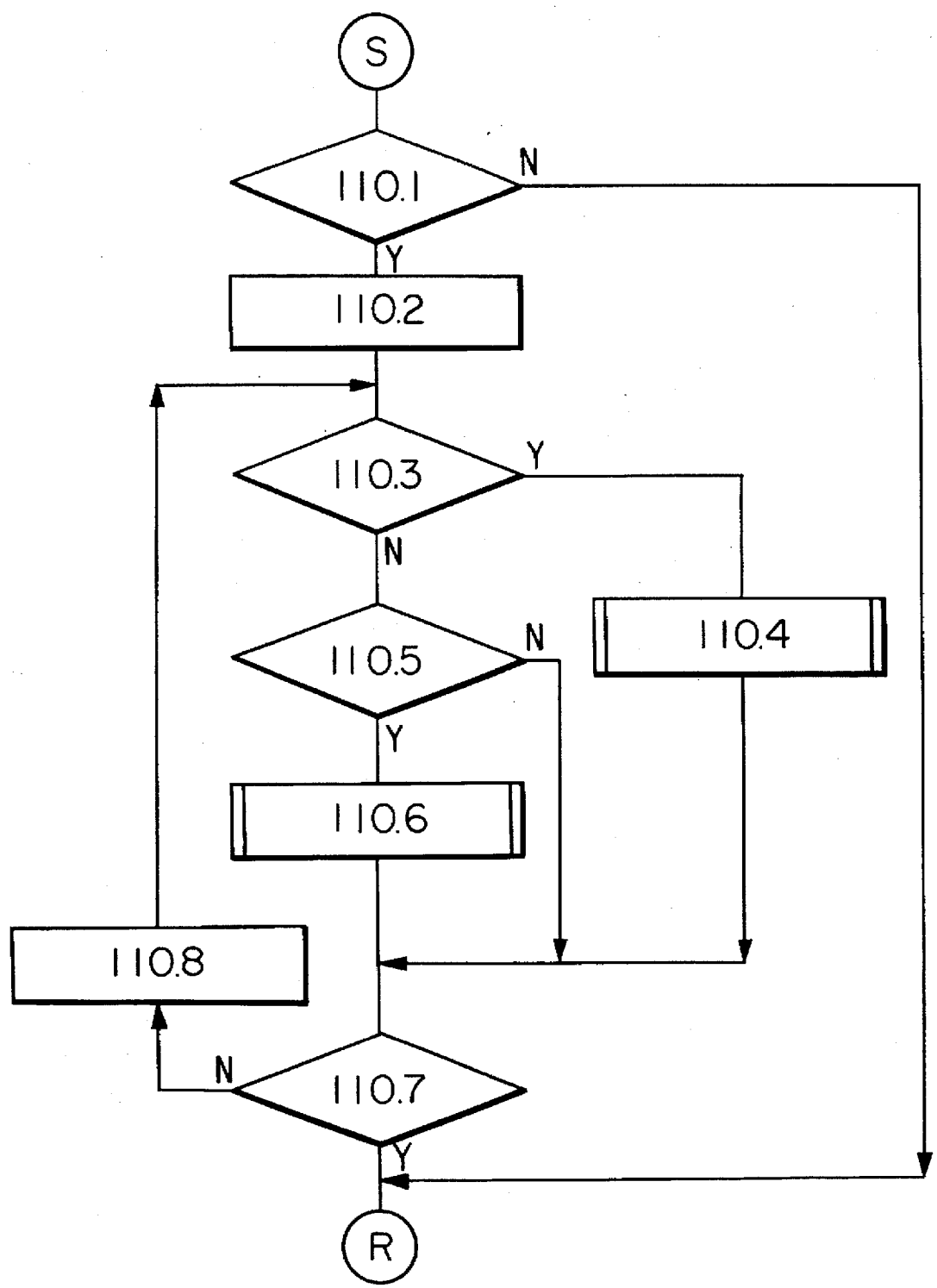
FIG. 18 is a flow chart showing processing in response to actuation of a result key.

The result key input processing of the step 110 is explained with reference to FIG. 18.
110.1. Is the cursor on the margin position?
110.2. Set the start address of the cursor row to the buffer pointer BP.
103.3. Is B(BP) the operator code?
103.4. Execute calculation key input processing.
105.5. B(BP) the operator code ⊜?
110.6. Execute result output processing.
110.7. Is BP at the end of the row?
110.8. Increment BP In the step 110.1, the current margin position is checked, and if the cursor is on the margin position, the process goes to the step 110.2, and if not, the process returns. In the step 110.2, a start address of the row is set to the buffer pointer BP of the buffer BUF1 and the process goes to the step 110.3. In the step 110.3, the content of the B(BP) is checked, and if it is an operator code ⊕, ⊖, ⊗, ⊙ or ⓢ, the process goes to the step 110.4, and if not, the process goes to the step 110.5. In the step 110.4, the calculation key input processing of the step 108 is executed and the process then goes to the step 110.7. In the step 110.5, the content of the B(BP) is checked, and if it is the code ⊜, the process goes to the step 110.6, and if not, the process goes to the step 110.7. In the step 110.6, the result output processing is executed and the process the goes to the step 110.7. The result output processing will be explained later. In the step 110.7, if the buffer pointer BP points to the end of the row, the process returns, and if not, the process goes to the step 110.8. In the step 110.8, the content of the buffer pointer BP is incremented and the process goes to the step 110.3.

Figure 19:
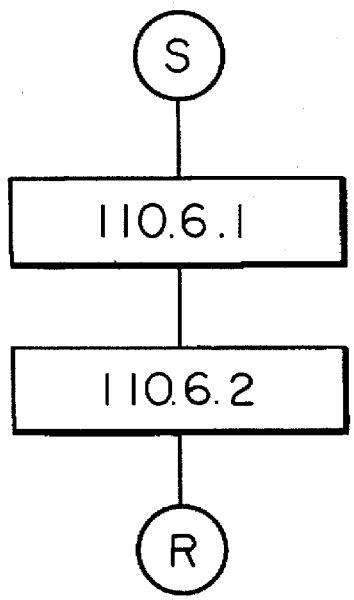
FIG. 19 is a flow chart showing result output processing by the second embodiment.

The result output processing in the step 110.6 is explained with reference to FIG. 19.
110.6.1. Execute result output processing.
110.6.2. Clear the accumulator register AR1.

In the step 110.6.1, the content of the buffer register BP is incremented and the content of the accumulator register AR is converted to a decimal number by a known technique; the decimal number is encoded; the encoded data is temporarily stored in the stack area SA; the data is transferred from the stack area SA to the buffer B(BP) one at a time; and the operation result is displayed on the CRT screen. The buffer pointer BP is incremented by the number equal to the number of times of transfer. In the step 110.6.2, the content of the accumulator register AR1 is cleared.

While the operator key is used to set the operator code in the present embodiment another function key (control key) on the function key keyboard KB21 and a character key may be simultaneously depressed to set the operator code.

While the arithmetic operation is carried out for each row at a time in the present embodiment, if the operator codes are present in more than one row the position of the numeric data may be pointed to by the cursor to carry out the arithmetic operation by the calculation key on the keyboard KB21 shown in FIG. 12, and the position of the operation result may be pointed to by the cursor to display the operation result on the CRT screen by the result key. In the present embodiment, by providing a function of tabulating to the operator code and specified the numeric data by the tabulation key on the keyboard BK21 shown in FIG. 12, the operation on the CRT screen can be efficiently carried out.

As described hereinabove, by adding the operator to the numeric data to be arithmetically operated, the user of the word processor can proceed with the operation while confirming the arithmetic operation for the numeric data on the CRT screen.

By designating the row, the numeric data for the arithmetic operation need not be designated. Thus, the arithmetic operation is carried out for each row at a time with a simpler procedure than that of the prior art.

FIG. 20 shows a block diagram of a further embodiment of the present invention. CPU2 denotes a microprocessor which carries out arithmetic and logical operations and controls devices connected to an address bus AB2, a control bus CB2 and a data bus DB2, through those buses. The address bus AB2 transfers signals for specifying items to be controlled. The control bus CB2 supplies control signals to the items to be controlled. The data bus DB2 transfers data. ROM2 denotes a control memory, for example, a read-only memory, which stores therein control steps shown in FIGS. 24-30. RAM2 denotes a random access memory which temporarily stores data therein. The random access memory RAM2 may comprise a tabulation code register TR for storing an operator code, an accumulator register AR for accumulating operation results, a data register DR for storing a new input data and stack areas SA(0)-SA(5).

Figure 21:
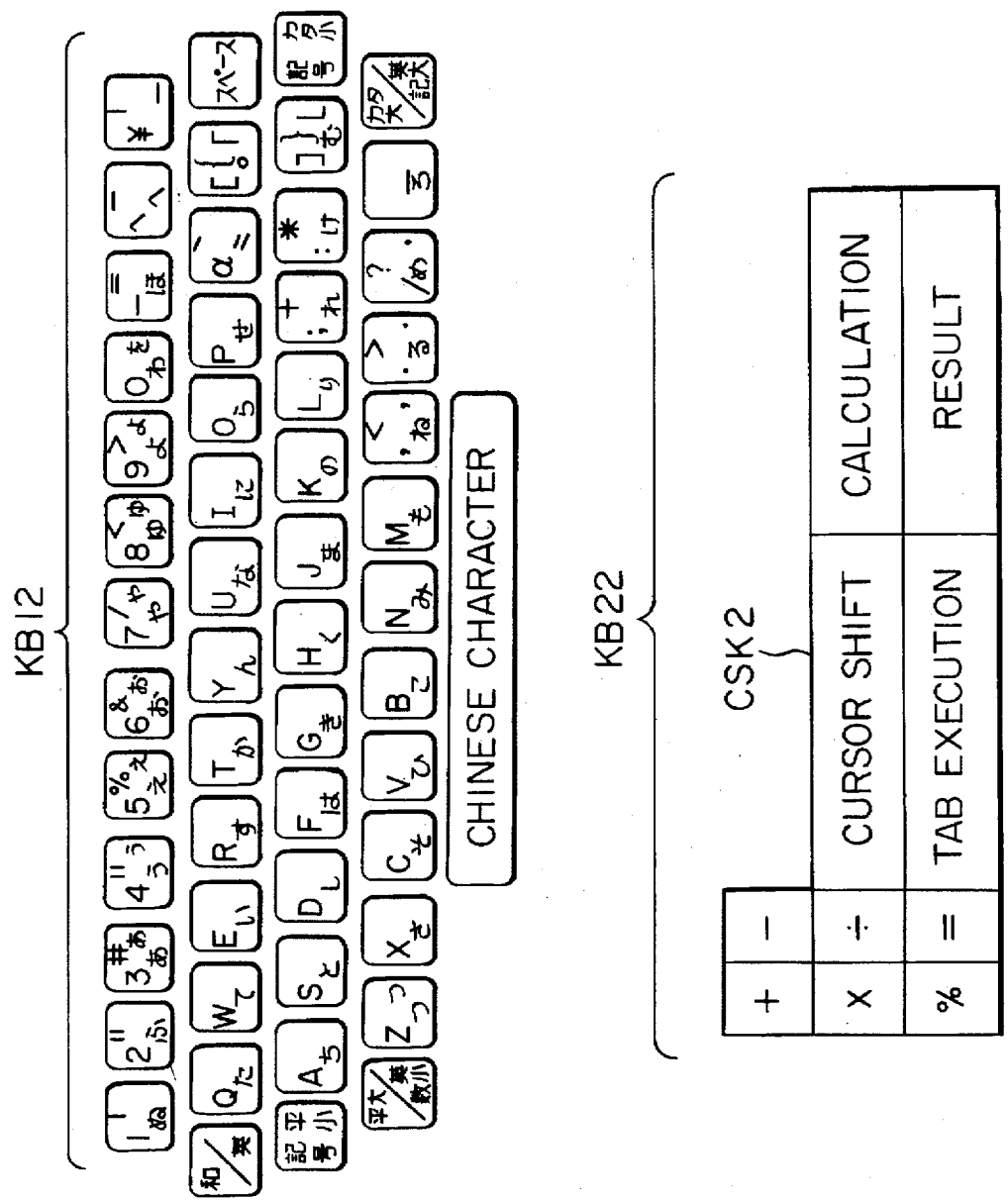
FIG. 21 shows a detail of a keyboard shown in FIG. 20.

KB2A denotes a keyboard having keys for entering the data and functions to the word processor. The keyboard KB2A comprises a character key keyboard KB12 and a function key keyboard KB22. A detail of the key arrangement of the keyboard KB2 is shown in FIG. 21. The character key keyboard KB12 has keys for entering characters and a KANJI designation key CHINESE CHARACTER which is used to indicate that input KANA characters represent a KANJI character when the KANJI character is entered by the KANA characters representative of the phonetic representation of the KANJI character. (Again, the characters shown are for purposes of illustration.) The function key keyboard KB22 has a cursor shift key [CURSORSHIFT] CSK, six generation keys ⊞, ⊟, ⊠, ⊞, ⊠ and ⊟, a tabulation key [TAB], a calculation key [CALCULATION], and a result key [RESULT].

Referring again to FIG. 20, CR2 denotes a cursor register which is read and written by the microprocessor CPU2. A CRT controller CRT2 to be described later displays a cursor at a position on a display CRT2 which corresponds to the address stored in the cursor register CR2. The information stored in the cursor register CR2 is one of serial numbers 0-31. The CRT controller CRTC2 converts the serial number to a row number and a column number for display.

BUF2 denotes a buffer memory having a 32-word capacity and stores document information entered from the keyboard KB2A. The content of the buffer memory BUF2 is represented by B(N) in the following description of the operation. That is, B(N) represents the content of the buffer at address N, where N is 0, 1, 2, . . . , 31.

Figures 22, 23:
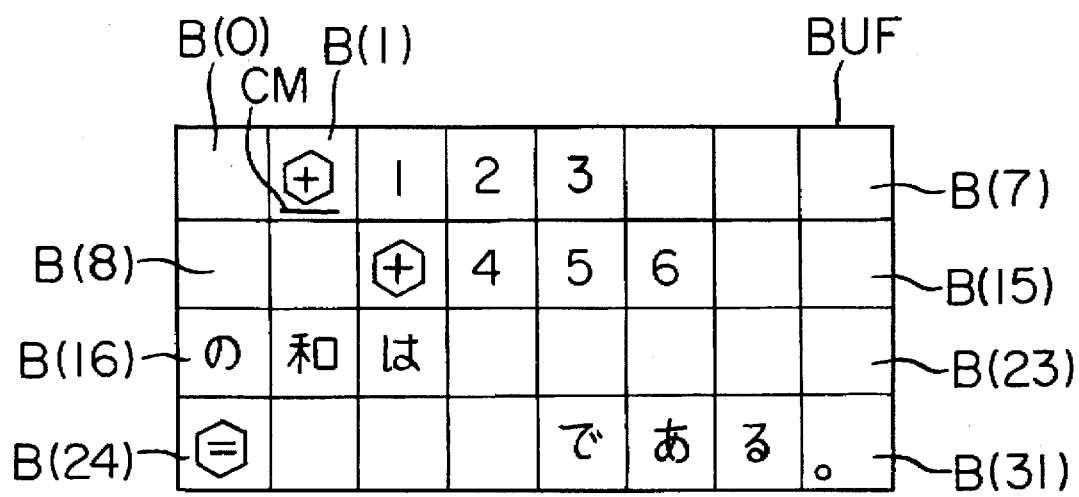
FIG. 22 shows a detail of a buffer memory.
FIG. 23 shows a diagram for explaining a relation between a tabulation and an actual mathematical formula.

The CRT controller CRTC2 functions to display the contents of the cursor register CR2 and the buffer memory BUF2 on the display CRT2. The content of the buffer memory BUF2 is displayed on the display CRT2 in a matrix of four rows by eight columns. A relation between the data arrangement in the buffer memory BUF2 and the display on the CRT screen is shown in FIG. 22 by B(0), B(1), B(2), ... The cursor CM is displayed at a row and a column determined by the content of the cursor register CR2. The cursor is displayed by referring to a character generator CG2.

The display CRT2 is a four-row by eight-column display and displays the characters and the cursor under the control of the CRT controller CRTC2.

The character generator CG2 generates character codes for the characters to be displayed on the display CRT2 or to be printed out by a printer PRT2, which prints out the information stored in the buffer memory BUF2.

The operation of the present embodiment thus constructed is now explained.

In the present embodiment, when power is turned on, the memories such as the registers and the buffer are automatically cleared and the cursor CM is shifted to a home position B(0) on the CRT screen and the CRT screen is cleared to be ready for the keyboard operation. After the power has been turned on, a user enters characters shown in FIG. 22.

The KANJI character is entered by shifting the cursor CM to a desired position by the cursor shift key CSK and depressing the corresponding character key. In the KANA-–KANJI conversion system, KANA characters are entered and they are converted to the KANJI character also by the known KANA–KANJI conversion technique. The KANJI character also may be entered by a tablet keyboard or a multi-shift keyboard.

An operator code is set to a numeric data to be arithmetically operated on, by depressing an operator key. The microprocessor CPU2 handles a series of numeric data following the operator code as one data. In the present embodiment, the data is represented by 16-bit integer.

Six operator codes are used. By depressing one of and operator set keys ⊞, ⊟, ⊠, ⊞, ⊠ and ⊟ on the keyboard KB2, a operator symbol ⊕, ⊖, ⊗, ⊘, ⓢ or ⊜, respectively, is displayed on the CRT screen, which represents addition, subtraction, multiplication, division, percentage calculation and equal, respectively. A relation between the operator symbol on the CRT screen and an actual mathematical formula is shown in FIG. 23. After the operator code has been added to the numeric data to define the arithmetic operation, the arithmetic operation is carried out in the following steps.

Step 1. The cursor CM is shifted to a start position and the tabulation key [TAB] is depressed so that the cursor CM is shifted to the first operator code position.

Step 2. When the numeric data is to be arithmetically operated on, the calculation key is depressed. As a result, the numeric data is stored in the data register DR and the contents of the accumulator register AR and the data register DR are arithmetically operated on in accordance with the operator code also representing an operator, and the operation result is stored in the accumulator register AR.

Step 3. The tabulation key [TAB] is depressed and the cursor CM is shifted to the next operator code position. When the numeric data is to be arithmetically operated on, the calculation key is depressed.

Step 4. The cursor is shifted to a position where it is desired to display the operation result. (Usually this position is indicated by the operator code ⊜, although the operator code is not always necessary.) By depressing the result key, the operation result, that is, the content of the accumulator register AR is displayed at the positions following to the cursor position. The content of the accumulator register AR is cleared.

Figure 24:
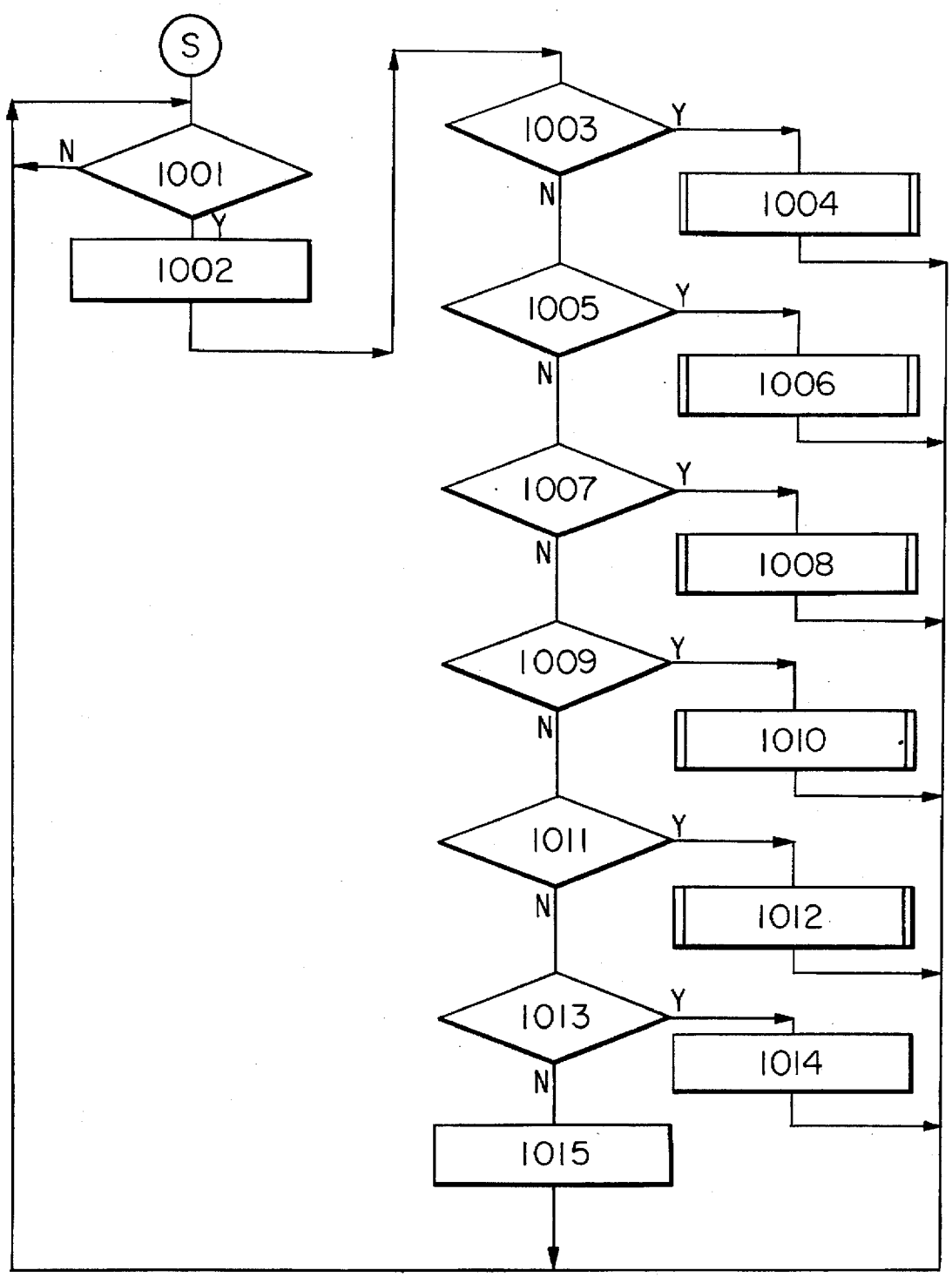
FIG. 24 is a flow chart processing of information by the word processor of the third embodiment of the present invention.

The above steps are explained in further detail with reference to a flow chart shown in FIG. 24. The power is first turned on and the initialization process is carried out to allow the keyboard operation.

When a key on the keyboard KB2A is depressed, the following steps are executed.

1001. Is a data entered from the keyboard KB2?
1002. Read in the data.
1003. Is the data entered from the cursor key?
1004. Execute cursor key input processing.
1005. Is the data entered from the character key or the tabulation code set key?
1006. Execute character key input processing.
1007. Is the data entered from the tabulation key?
1008. Execute tabulation key input processing.
1009. Is the data entered from the calculation keys?
1010. Execute calculation key input processing.
1011. Is the data entered from the result key?
1012. Execute result key input processing.
1013. Is the data from an addition key?
1014. Execute edition key input processing.
1015. Clear the input data.

In the step 1001, the input from the keyboard KB2 is checked. If no input is entered, the process waits until the input is entered from the keyboard KB2A. If the input is entered, the process goes to the step 1002. In the step 1002, the data from the keyboard KB2A is read in. In the step 1003, if the input data is a data from the cursor shift key CSK, the process goes to the step 1004, and if not, the process goes to the step 1005. In the step 1004, the cursor key input processing is executed. A detail of the cursor key input processing will be explained later with reference to FIG. 26. In the step 1005, if the input data is a data from the character key or an operator code key, the process goes to the step 1006, and if not, the process goes to the step 1007. In the step 1006, the character key input processing is executed. A detail thereof will be explained later with reference to FIG. 27. In the step 1007, if the input data is a data from the tabulation key, the process goes to the step 1008, and if not, the process goes to the step 1009. The tabulation key input processing in the step 1008 will be explained later with reference to FIG. 28. In the step 1009, if the input data is a data from the calculation key, the process goes to the step 1010, and if not, the process goes to the step 1011. The calculation key input processing in the step 1010 will be explained later with reference to FIG. 29. In the step 1011, if the input data is a data from the result key, the process goes to the step 1012, and if not, the process goes to the step 1013. The result key input processing in the step 1012 will be explained later with reference to FIG. 30. In the step 1013, if the input data is a data from the edition key, the process goes to the step 1014, and if not, the process goes to the step 1015. In the step 1014, the edition key input processing is executed. For example, a document data already composed may be corrected. In the step 1015, it is determined that the input data is invalid, and the input data is cleared.

Figure 25:
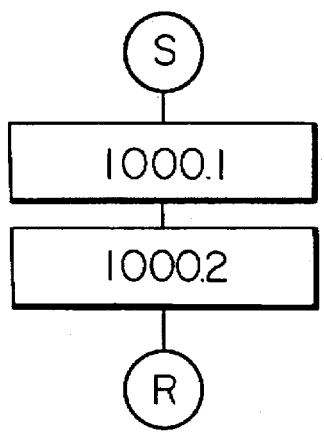
FIG. 25 is a flow chart showing an initialization process of the third embodiment.

The initialization process comprises two steps 1000.1 and 1000.2 as shown in FIG. 25.

1001.1. CR=0
1001.2. B(N)=space code (N=0, 1, 2, . . . , 31)

In the step 1001.1, the content of the cursor register CR2 is reset to "0". In the step 1000.2, the memory buffer BUF2 is filled with space codes to clear the display screen of the display CRT2.

Figure 26:
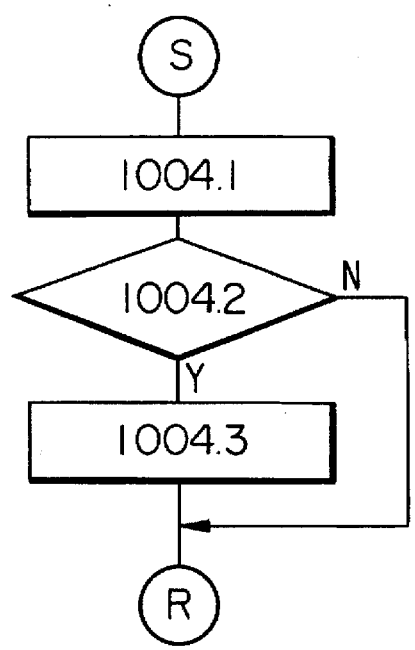
FIG. 26 is a flow chart showing processing in response to actuation of the cursor key.

The step 1004 is explained in further detail with reference to FIG. 26.

1004.1. Increment CR
1004.2. CR≧32?
1004.3. CR=0

In the step 1004.1, the content of the cursor register CR2 is incremented. In the step 1004.2, if CR≧32, the process goes to the step 1004.3, and if not, the process returns. In the step 1004.3, the content of the cursor register CR2 is reset to "0" (CR=0).

Figure 27:
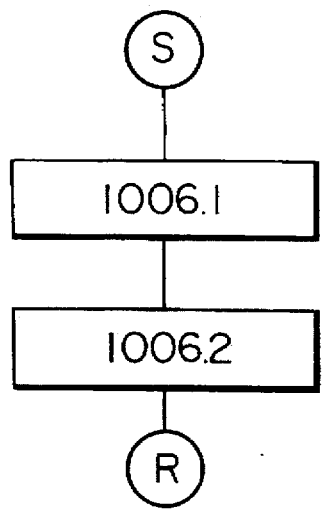
FIG. 27 is a flow chart showing processing in response to actuation of character keys.

The character key input processing in the step 1006 is explained with reference to FIG. 27.

1006.1. B(CR)=input data
1006.2. Execute cursor key input processing (step 1004).

In the step 1006.1, the input data code is stored at a data address of the memory buffer BUF2 which corresponds to the content of the cursor register CR2 (B(CR)=input data). Thus, the input data is displayed at the cursor position on the CRT screen of the display CRT2. In the step 1006.2, the cursor CM is advanced by one step. That is, the cursor key input processing of the step 1004 is executed.

Figure 28:
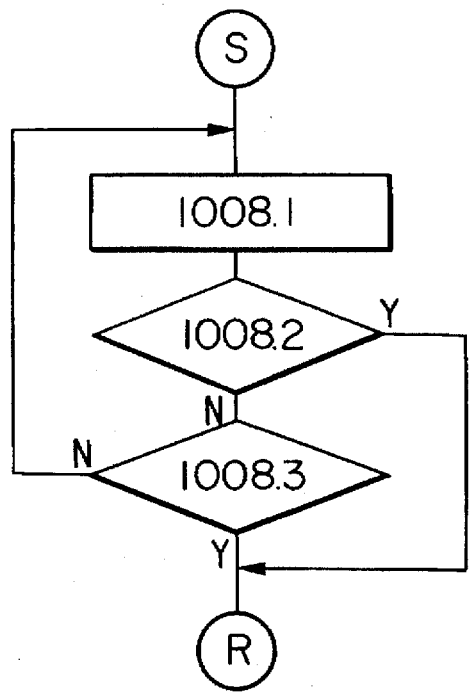
FIG. 28 is a flow chart showing processing in response to actuation of the tabulation key.

The tabulation key input processing in the step 1008 is explained with reference to FIG. 28.

1008.1. Execute cursor key input processing (step 1004)
1008.2. CR=0?
1008.3. B(CR)=operator code?

In the step 1008.1, the cursor CM is shifted by one step. That is, the cursor key input processing of the step 1004 is executed. In the step 1008.2, if CR=0, the process returns, and if CR≠0, the process goes to the step 1008.3. In the step 1008.3, if B(CR) is the operator code, the process returns, and if not, the process goes back to the step 1008.1.

Figure 29:
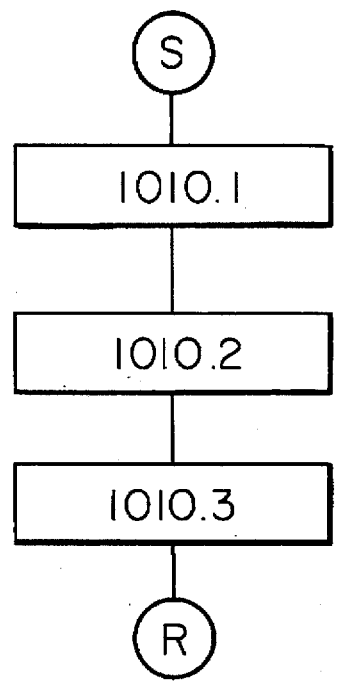
FIG. 29 is a flow chart showing processing in response to actuation of the calculation key.

The calculation key input processing in the step 1010 is explained with reference to FIG. 29.

1010.1. Read in operator code.
1010.2. Read in numeric data
1010.3. Execute arithmetic operation.

In the step 1010.1, the operator code at the cursor position is read from the buffer memory BUF2 into the operator code register TR. If the code is other than the operator code, the process returns to the step 1001. In the step 1010.2, the next position to the operator code position in the buffer memory BUF2 is retrieved and the numeric data is read in sequentially and stored in the stack area SA. If the code first retrieved is other than the numeric code, the process returns to the step 1001. The operation is continued until the numeric data is interrupted. The stack area has six stages SA(0)–SA(5). If more than six numeric data are read in, the first-in data are pushed out. The numeric data stored in the stack area are read out in a last-in first-out manner and converted to binary numbers in a known technique, and the binary numbers are stored in the data register DR. In the step 1010.3, the content of the data register DR2 stored in the step 1010.2 and the content of the accumulator register AR are arithmetically operated on in accordance with the content of the operator code stored in the tabulation code register, and the operation result is stored in the accumulator register AR. In the division and percent operations, the fractions are thrown away and an overflow processing is not carried out.

Figure 30:
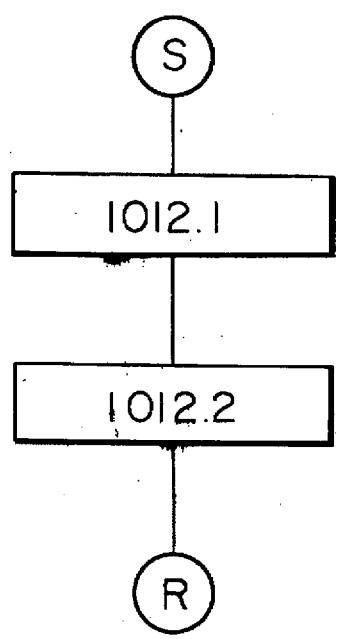
FIG. 30 is a flow chart showing processing in response to actuation of the result key.

The result key input processing in the step 1012 is explained with reference to FIG. 30.

1012.1. Execute result output processing
1012.2. Clear the content of the accumulator register.

In the step 1012.1, the content of the accumulator register AR is converted to a decimal number by a known technique, the decimal number is encoded and temporarily stored in the stack area SA. The data is transferred to the positions following to the cursor position in the buffer memory BUF2 to display the operation result on the CRT screen of the display CRT2. In the step 1012.2, the content of the accumulator register AR is cleared.

While the operator code keys are used to set the operator code in the present embodiment, it may be set by simultaneously depressing another function key (control key), and a character key. While the data register DR2 and the address register can handle only the 16-bit integers in the present embodiment, those registers may be 32-bit registers and the data may be represented in a floating decimal point system so that decimals can be handled with a high precision of operation. In this case, however, the stack area must be expanded.

As described hereinabove, according to the present invention, by adding to the numeric data the operator code representative of the operator of the arithmetic operation, the data following the operator code can be identified as the numeric data for the arithmetic operation, and the arithmetic operation for the numeric data can be identified on the CRT screen. By carrying out the tabulation function when the numeric data to be arithmetically operated is designated, the operation can be carried out in simpler steps than in the prior art.

What I claim is:

1. A processor for processing both words and numeric data and for performing arithmetic operations on the numeric data at any point in a document, said processor comprising:

input means for entering character data, numeric data and operation data without changing an input mode;

cursor control input means for moving a cursor;

memory means for storing said character data, said numeric data, operation data, and a combination of numeric data and operation data entered by said input means;

fetching means for fetching the numeric data out of an area containing said character data and said numeric data stored in said memory means;

conversion means for converting said numeric data to numeric data in a form suitable for performing an arithmetic operation on the converted numeric data;

operation means for performing an arithmetic operation on said numeric data converted by said conversion means in accordance with the operation data;

display means for displaying the cursor, the character data, the numeric data, and operation data entered by said input means, and a result of the arithmetic operation performed by said operation means; and display control means for controlling said display means to display the operation result at a position specified by the cursor when the operation result is displayed on a screen of said display means, with the character data, the numeric data, and operation data entered by said input means.

2. A processor according to claim 1 wherein said display means comprises a display unit capable of displaying m lines and n rows of characters, where m and n are integers.

3. A processor according to claim 1 wherein said input means comprises a keyboard having a plurality of keys.

4. A processor according to claim 1 further comprising operation data memory means for storing the operation data entered by said input means.

5. A processor according to claim 1 further comprising a stack memory for storing a plurality of numeric data used to perform said arithmetic operation on said numeric data converted by said conversion means.

6. A word processor according to claim 1 wherein said cursor control input means comprises at least one cursor key and wherein said character data entered by said input means is stored at a position in said memory means corresponding to a position specified by said cursor.

7. A processor for processing both words and numeric data and for performing arithmetic operations on the numeric data at any point in a document, said processor comprising:

input means for entering character data, numeric data, and operation data without changing an input mode;

cursor control input means for moving a cursor;

memory means for storing the character data, the numeric data, the operation data, and a combination of numeric data and operation data;

display means for displaying the cursor, the numeric data, and the character data entered by said input means;

converting means for converting the numeric data stored in said memory means into numeric information in a form suitable to undergo an arithmetic operation;

operation means for performing an arithmetic operation on the converted numeric information converted by said converting means in accordance with the operation data;

determination means for determining an area at which a result of the arithmetic operation on the numeric information will be displayed;

control means for causing said operation means to perform the arithmetic operation on the numeric information; and means for displaying a result of the arithmetic operation performed by said operation means on said display means at the area determined by said determination means, with the character data, the numeric data, and the operation data.

8. An information processing system according to claim 7 wherein said cursor control input means comprises at least one cursor key and wherein character data entered by said input means is stored at a position in said memory means corresponding to a position determined by said cursor.

9. An information processing system according to claim 7 wherein said input means comprises a keyboard having a plurality of keys.

10. An information processing system according to claim 7 further comprising operation data memory means for storing operation data entered by said input means.

11. An information processing system according to claim 7 further comprising a stack memory for storing a plurality of numeric data used to perform an arithmetic operation on said plurality of numeric data.

12. A processing method for processing both words and numeric data and for performing arithmetic operations on the numeric data at any point in a document, said word processing method comprising the steps of:

entering character data, numeric data, and operation data into an apparatus without changing an input mode;

storing the entered numeric data, the operation data, and a combination of the numeric data and operation data;

converting the stored numeric data to information in a form suitable to undergo an arithmetic operation in accordance with the operation data;

performing an arithmetic operation on the information converted in said converting step; and displaying a result of the arithmetic operation on a display, with the character data, the numeric data, and the operation data.

13. A computer useable medium for storing a computer readable program code means for processing both words and numeric data and for performing arithmetic operations on the numeric data at any point in a document, said medium comprising:

computer readable program code means for permitting character data, numeric data, and operation data to be input into an apparatus without changing an input mode thereof;

computer readable program code means for causing the apparatus to store the entered numeric data, the operation data, and a combination of the numeric data and operation data;

computer readable program code means for causing the apparatus to convert the stored numeric data to information in a form suitable to undergo an arithmetic operation in accordance with the operation data;

computer readable program code means for causing the apparatus to perform an arithmetic operation on the converted information; and computer readable program code means for causing said apparatus to display a result of the arithmetic operation on a display, with the character data, the numeric data, and the operation data.

14. A medium according to claim 13, wherein said result of the arithmetic operation is displayed at a position defined by a cursor on the display.

* * * * *

UNITED STATES PATENT AND TRADEMARK OFFICE
CERTIFICATE OF CORRECTION

PATENT NO. : 5,675,827
DATED : October 7, 1997
INVENTOR(S) : Yuichi BANNAI

It is certified that error appears in the above-identified patent and that said Letters Patent is hereby corrected as shown below:

Column 2:

Line 13, "a" should be deleted.

Column 6:

Line 65, "function keyboard" should read "function key".

Column 7:

Line 38, "by" should be deleted.

Column 11:

Line 4, "specified" should read --specifying--.
Line 7, "operator" should read --operator code--.
Line 27, "tabulation" should read --operator--.

UNITED STATES PATENT AND TRADEMARK OFFICE
CERTIFICATE OF CORRECTION

PATENT NO. : 5,675,827
DATED : October 7, 1997
INVENTOR(S) : Yuichi BANNAI

It is certified that error appears in the above-identified patent and that said Letters Patent is hereby corrected as shown below:

Column 11

Line 31, "the" should be deleted.
    Line 35, "KB2" should read --KB2A--.
    Line 44, "generation" should read --operator--.

Column 12:

Line 23, "also" should be deleted.
    Line 32, "and" should be deleted.

Column 13:

Line 12, "tabulation code set" should read --operator code--.

UNITED STATES PATENT AND TRADEMARK OFFICE
CERTIFICATE OF CORRECTION

PATENT NO. : 5,675,827
DATED : October 7, 1997
INVENTOR(S) : Yuichi BANNAI

It is certified that error appears in the above-identified patent and that said Letters Patent is hereby corrected as shown below:

<u>Column 16</u>:

Line 1, "word" should be deleted.

Signed and Sealed this

Thirteenth Day of October 1998

Attest:

BRUCE LEHMAN

*Attesting Officer*  *Commissioner of Patents and Trademarks*